US008036790B2

(12) United States Patent
Kannan et al.

(10) Patent No.: US 8,036,790 B2
(45) Date of Patent: Oct. 11, 2011

(54) ON-VEHICLE ELECTRONIC CONTROL DEVICE

(75) Inventors: Yasuhiko Kannan, Chiyoda-ku (JP); Mitsunori Nishida, Chiyoda-ku (JP); Shozo Kanzaki, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 414 days.

(21) Appl. No.: 12/402,186

(22) Filed: Mar. 11, 2009

(65) Prior Publication Data

US 2010/0004811 A1 Jan. 7, 2010

(30) Foreign Application Priority Data

Jul. 2, 2008 (JP) ................................ 2008-173697

(51) Int. Cl.
*G06F 7/00* (2006.01)

(52) U.S. Cl. ........................................................ 701/36

(58) Field of Classification Search .................... 701/36; 713/500; 307/11, 43
See application file for complete search history.

(56) References Cited

U.S. PATENT DOCUMENTS

| | | | | |
|---|---|---|---|---|
| 5,526,267 | A * | 6/1996 | Sogawa | 701/114 |
| 6,678,586 | B2 * | 1/2004 | Nakamoto et al. | 701/1 |
| 7,305,283 | B2 * | 12/2007 | Sayama et al. | 701/1 |
| 7,343,509 | B2 * | 3/2008 | Sayama et al. | 713/500 |

FOREIGN PATENT DOCUMENTS

| | | | |
|---|---|---|---|
| JP | 05-195895 | A | 8/1993 |
| JP | 2000-282930 | A | 10/2000 |
| JP | 2002-089351 | A | 3/2002 |
| JP | 2002-371897 | A | 12/2002 |
| JP | 2003-214246 | A | 7/2003 |
| JP | 2003-232250 | A | 8/2003 |
| JP | 2003-315474 | A | 11/2003 |
| JP | 2004-232521 | A | 8/2004 |
| JP | 2004-245112 | A | 9/2004 |
| JP | 2004-293438 | A | 10/2004 |
| JP | 2005-031993 | A | 2/2005 |
| JP | 2005-299517 | A | 10/2005 |
| JP | 2007-008386 | A | 1/2007 |
| JP | 2007-069660 | A | 3/2007 |
| JP | 2007-162610 | A | 6/2007 |
| JP | 2007-309301 | A | 11/2007 |

* cited by examiner

*Primary Examiner* — Faye M. Fleming
(74) *Attorney, Agent, or Firm* — Sughrue Mion, PLLC

(57) ABSTRACT

Provided is an on-vehicle electronic control device with low cost and low power consumption for performing monitoring control in both a driving mode and a parking mode of a vehicle. A main CPU is supplied with electric power from an on-vehicle battery via a power switching element and a main power supply circuit so as to control a plurality of electric loads in accordance with operating states of a plurality of input sensors. A sub CPU connected to the main CPU via a serial interface is supplied with electric power from the on-vehicle battery via a sub power supply circuit so as to monitor operations of the main CPU and input signals. The sub CPU has low speed and small memory capacity so as to operate with lower power consumption compared with the main CPU.

15 Claims, 9 Drawing Sheets

ON-VEHICLE ELECTRONIC CONTROL DEVICE

BACKGROUND OF THE INVENTION

1. Field of the Invention

The present invention relates to an improvement of an on-vehicle electronic control device suitable for detecting fuel evaporation from a fuel tank in a parked state, measuring parking time, or the like.

2. Description of the Related Art

There are various known electronic control devices to which electric power is supplied from a battery mounted on a vehicle in an unmanned and parked state. They are used for detecting whether or not vapor generated in a fuel tank for an internal combustion engine mounted on a vehicle leaks to the outside of the fuel tank, for detecting whether or not a temperature sensor for cooling water for an internal combustion engine detects a decrease in water temperature as time passes after an engine stops, and/or for monitoring a state of a parked vehicle and performing blinking warning display as a part of functions of vehicle antitheft control.

For instance, there is provided an electronic control device performing control with the use of electric power supplied from a battery when a power switch is turned on (see paragraphs [0003] to [0005] and FIG. 1 of JP 2003-315474 A (hereinafter referred to as Patent Document 1), for instance). Patent Document 1 discloses a concept of a soak timer for detecting parked time for preheat control of cooling water or detection of fuel evaporation, which measures the parked time in appropriate measuring time and measuring accuracy for an application as a wide range specification.

According to Patent Document 1, a soak timer IC keeps time in a parked state where the power switch of a vehicle is opened, and after a predetermined period of time a power supply relay is driven to activate a host microcomputer as an engine control device. The host microcomputer performs predetermined control and then issues an instruction about the next activation to the soak timer IC. Then, the host microcomputer stops its action, and the power supply relay is turned off.

However, the soak timer IC can receive an instruction for selecting a clock unit and an instruction for activation clock time from the host microcomputer when the power switch is closed, but does not have a function of detecting fuel evaporation on by itself. In other words, presence or absence of fuel evaporation and/or an abnormal state of a water temperature sensor are detected by the host microcomputer itself as the engine control device while the soak timer IC is an IC only for keeping time.

In addition, there is provided an electronic control device for a vehicle, which is used for preventing a battery from being exhausted due to activation of an on-vehicle device while the engine is stopped (see paragraph [0017], Abstract, and FIG. 1 of JP 2003-232250 A (hereinafter referred to as Patent Document 2), for instance). In this electronic control device for a vehicle, the microcomputer as the engine control device is supplied with electric power from the on-vehicle battery via a power supply relay with a self holding action when the power switch is closed, and includes a timer function for keeping parked time after the power switch is opened. The microcomputer checks an abnormal state at the time point when a predetermined parked time has passed, and then turns off the power supply relay.

This electronic control device for a vehicle does not need a special IC for keeping the parked time. When discharge current of the on-vehicle battery increases after the power switch is opened so that the engine stops, the electronic control device measures discharging capacity of the on-vehicle battery in advance and then judges whether or not to keep the parked time.

In addition, there is provided a failure diagnosis apparatus for engine temperature sensing means, which can check a failure of the water temperature sensor for sensing cooling water temperature for the engine accurately and in early timing after the start of the engine (see paragraph [0026], Abstract, and FIG. 1 of JP 2000-282930 A (hereinafter referred to as Patent Document 3), for instance).

According to Patent Document 3, the engine control device includes a soak timer for detecting stop time of the engine, so as to keep parking time after the power switch is opened until it is closed again. By observing a change in cooling water temperature along with the parking time, the presence or absence of an abnormal state of the water temperature sensor is determined. Further, the action of the engine control device is stopped when the power switch is opened, but the soak timer works to keep the parking time with low power consumption by a backup voltage supplied continuously after the power switch is opened.

On the contrary, as a technique related to the present invention, there is a known electronic control device installed in a vehicle, which includes a main CPU and a sub CPU. In this on-vehicle electronic control device, the sub CPU and the main CPU cooperate with each other and work in parallel, whereby the sub CPU performs an assistant job such as bearing a part of an input and output control function or monitoring presence or absence of an abnormal state of the main CPU or an input and output circuit (see Abstract and FIG. 1 of JP 2002-089351 A (hereinafter referred to as Patent Document 4), for instance).

According to this on-vehicle electronic control device, an input signal for low speed operation is supplied to the sub CPU that is connected to the main CPU via a serial interface, and the input signal information is transmitted to the main CPU via a serial communication circuit. In addition, an output circuit for low speed operation is connected to the sub CPU, and the output circuit responds to an output control signal transmitted from the main CPU via the serial communication circuit. As a result, the number of input and output ports of the main CPU can be reduced, an input filter constant can be adjusted or set by the sub CPU, or other various assistant jobs can be performed by the sub CPU.

In addition, there is provided an air intake amount control device for an engine, having a duplexed CPU system for control (see Abstract and FIG. 1 of JP 2002-371897 A (hereinafter referred to as Patent Document 5), for instance). According to this air intake amount control device for an engine, a sub CPU is connected via a serial interface to a main CPU having a throttle valve opening degree control function and an engine control function. The sub CPU cooperates with the main CPU so as to detect an abnormal state of control, to stop power supply to a motor for controlling the throttle valve opening degree when an abnormal state occurs, to perform abnormal state warning display or to bear other various assistant functions.

The electronic control device disclosed in Patent Document 1 described above includes an external oscillator having high accuracy, and a reference clock is generated based on an oscillation signal of the oscillator. The reference clock signal is counted for keeping the parked time. It is not discussed in Patent Document 1 that an oscillator of low power consumption, low cost and low accuracy is utilized effectively. Therefore, the electronic control device has a drawback in that power consumption of the on-vehicle battery increases when the power switch is opened.

In addition, the soak timer IC is merely for keeping the parked time and does not have a fuel evaporation detecting function. Therefore, the host microcomputer is required to be supplied with electric power so as to perform the fuel evaporation detection control action when the power switch is closed. Consequently, power consumption of the on-vehicle battery increases when the power switch is opened.

In addition, the device described in the above-mentioned Patent Document 2 does not perform control of power consumption of the on-vehicle battery in the parked state without being charged. Therefore, there arises a problem that set time of the timer for keeping the parked time is restricted or that the parked state cannot be monitored in order to prevent the on-vehicle battery from being in the over discharged state.

Further, in general, a timer circuit commonly called a soak timer keeps a lapse time after the power switch is closed and supplies electric power temporarily to the control device so as to activate a microprocessor when a predetermined period of time passes, whereby the microprocessor can perform short time measuring and monitoring control before turning off the power. Such the intermittent activation is repeated a plurality of times. Therefore, even if the activated operation ends in short time, there arises a problem that the activation of the microprocessor with high speed and large memory capacity can be a large load on the on-vehicle battery while the battery is not charged.

In addition, the device described in the above Patent Document 3 does not have a vehicle monitoring function during the parked state and is limited to the function of merely keeping the parking time after the power switch is opened until it is closed again. Therefore, there arises a problem monitoring control of the fuel evaporation detection cannot be performed during a period while the power switch is opened.

In addition, the devices described in the above Patent Documents 4 and 5 do not relate to the parked state monitoring after the power switch is opened, and the sub CPU is in the disabled state when the power switch is opened. Therefore, there arises a problem that the monitoring control of the fuel evaporation detection cannot be performed during the period while the power switch is opened.

SUMMARY OF THE INVENTION

The present invention has been made from the viewpoint described above, and it is a first object of the present invention to provide an on-vehicle electronic control device including a parked state monitoring function, which is inexpensive and of low power consumption and capable of controlling discharge of a battery.

In addition, it is a second object of the present invention to provide an on-vehicle electronic control device capable of obtaining measuring time with high accuracy with respect to long measurement parked time accompanying environment temperature variation.

An on-vehicle electronic control device according to the present invention includes:

a main control circuit portion supplied with electric power from an on-vehicle battery via a power switching element responding to an operation of a power switch and a main power supply circuit, including a microprocessor as a main CPU of high speed and large-capacity memory area for driving a plurality of electric loads responding to operating states of a plurality of input sensors and contents of a first program memory; and a sub control circuit portion including a middle speed clock signal source and a low speed clock signal source that are used selectively, supplied with electric power continuously from the on-vehicle battery via a sub power supply circuit, connected to the main CPU via a serial interface, and including a microprocessor as a sub CPU of middle speed and small-capacity memory area compared with the main CPU.

In the on-vehicle electronic control device, the sub CPU has a first operating mode, a second operating mode, and a third operating mode responding to a control program stored in a second program memory. The first operating mode is a parallel operating mode for operating based on a middle speed clock signal generated by the middle speed clock signal source in a closed state of the power switch, so as to operate in parallel with the main CPU and to communicate information with the main CPU, for detecting at least presence or absence of an abnormal state of a communication response in the main CPU and for monitoring an operating state of the main CPU. The second operating mode is an individual operating mode for operating in a predetermined period of time after the power switch is opened and the main CPU stops its operation, while a power supply switch element for enabling a part of input and output signals of the sub CPU is closed, so as to monitor a parked state of a parked vehicle based on the enabled part of the input and output signals and to measure a lapse time after the power switch is opened. The third operating mode is a time keeping only mode for operating based on a low speed clock signal generated by the low speed clock signal source, so as to measure a lapse time after the second operating mode is finished while the power supply switch element is opened in a period of time after the individual operation is finished until the power switch is closed again. Further, in the on-vehicle electronic control device, a monitoring function of the operating state of the main CPU is stopped in the second operating mode and the third operating mode, and an operation result of the sub CPU in the second operating mode and the third operating mode is transmitted to the main CPU in the first operating mode.

According to the present invention, the sub CPU, which performs the parked state monitoring of the vehicle in the closed state of the power switch, transmits the presence or absence of an abnormal state to the main CPU when the power switch is turned on, and monitors at least an abnormal state of the main CPU in the operating state. Therefore, it is not necessary to make the main CPU operate while the main power is turned off. It is sufficient that the sub CPU of low power consumption monitors the state of the parked vehicle and transmits a result of the monitoring to the main CPU when the main power is turned on. Therefore, it is possible to obtain the effect that the load on the main CPU can be reduced by the sub CPU sharing the load of functions, and that power consumption of the on-vehicle battery in the non-charging state can be reduced. In addition, it is possible to obtain the effect that the sub CPU performs not only the time keeping operation but also the diagnosis function for the main CPU in the operating state to thereby improve safety performance.

DETAILED DESCRIPTION OF THE PREFERRED EMBODIMENTS

First Embodiment

(1) Detailed Description of the Structure

Figure 1:
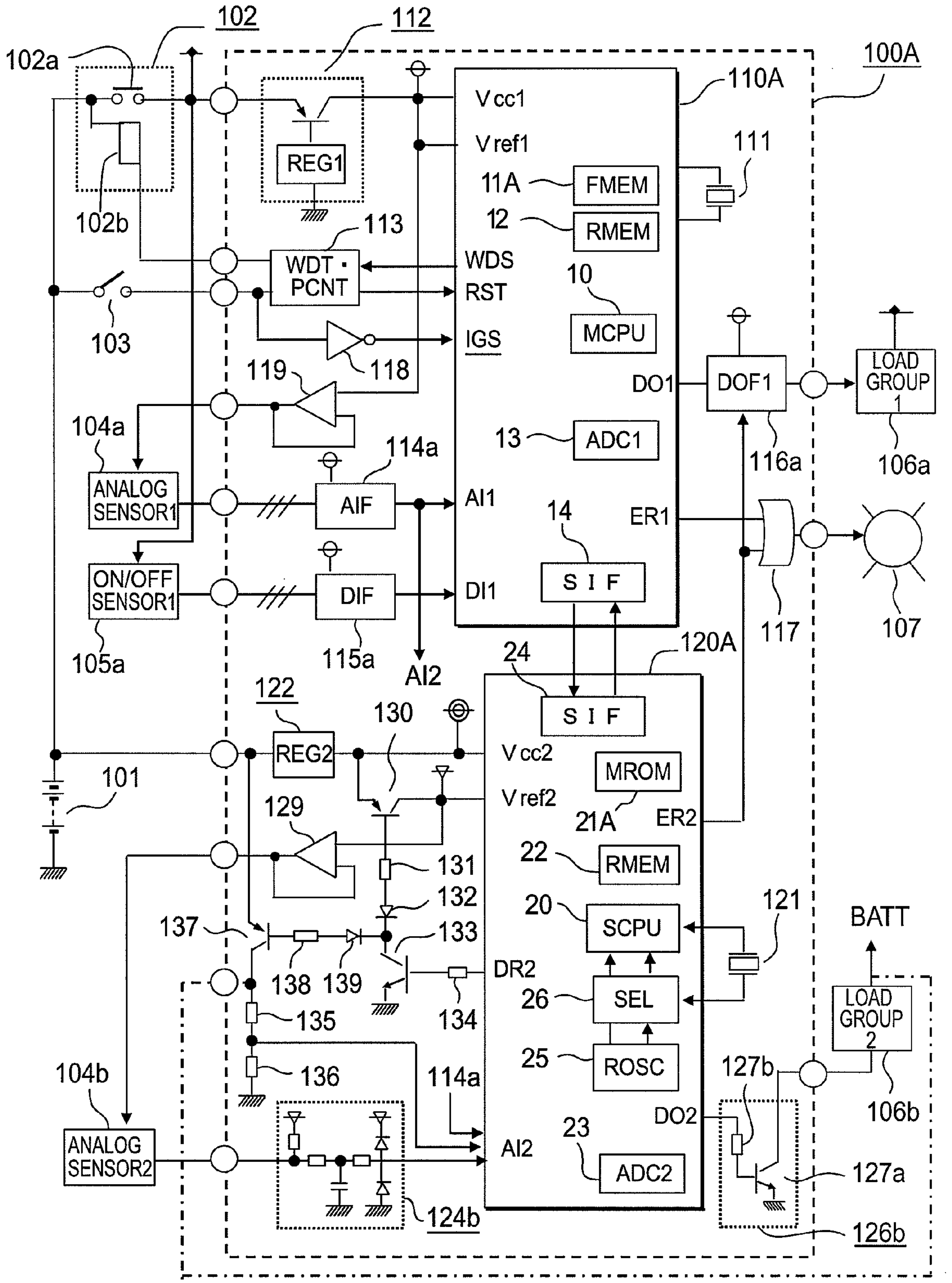
FIG. 1 is a general structural diagram of an on-vehicle electronic control device according to First Embodiment of the present invention.

Hereinafter, an embodiment illustrating the present invention is described. FIG. 1 is a general structural diagram of an on-vehicle electronic control device according to First Embodiment of the present invention. In FIG. 1, an on-vehicle electronic control device 100A is mainly made up of a main control circuit portion 110A and a sub control circuit portion 120A and is housed in a sealed casing (not shown). External devices connected to the on-vehicle electronic control device 100A include an on-vehicle battery 101, a power supply relay 102 including a power switching element 102*a* as an output contact and an exciting coil 102*b*, a power switch 103, first and second analog sensors 104*a* and 104*b*, a first switch sensor 105*a*, first and second electric loads 106*a* and 106*b* and a warning display unit 107.

The main control circuit portion 110A is made up of a main CPU 10 that is a microprocessor, a first program memory 11A of a nonvolatile flash memory or the like, a RAM memory 12 for operational processing, a multichannel AD converter 13 and a serial-to-parallel converter 14.

The main CPU 10 performs 16 bit or 32 bit operation in synchronization with a high speed clock signal from a high speed clock signal source 111 using a ceramic resonator or a crystal resonator. This main CPU 10 has an operating speed of 80 MHz, for instance, and an accessible memory area up to 1 MByte, for instance. As a result, power consumption thereof is an order of 400 mW, for instance, which is so large that it is not suitable for parked state monitoring control.

A main power supply circuit 112 is supplied with electric power from the on-vehicle battery 101 via the power switching element 102*a* and supplies a first control voltage Vcc1 of DC 5 V and a first reference voltage Vref1 to the main control circuit portion 110A.

Note that the main CPU 10, the first program memory 11A, the RAM memory 12, the multichannel AD converter 13 and the serial-to-parallel converter 14 within the main control circuit portion 110A are supplied with electric power from the first control voltage Vcc1 while the first reference voltage Vref1 is supplied to a reference voltage terminal that defines a full scale input voltage of the multichannel AD converter 13. A low voltage like DC 3.3 V or DC 2.7 V may be applied to the first program memory 11A and the RAM memory 12.

A power source control circuit 113 drives the exciting coil 102*b* so as to close the power switching element 102*a* when the power switch 103 is closed. When the main power supply circuit 112 generates the first control voltage Vcc1, the main CPU 10 starts the operation and generates a watchdog signal WDS. If a pulse width of the watchdog signal WDS is a predetermined value or smaller as a normal state, a drive instruction for the exciting coil 102*b* is generated so that a self holding action of the power supply relay 102 is performed even if the power switch 103 is opened so that the main CPU 10 stops its operation until the watchdog signal WDS stops. In addition, if the main CPU 10 runs away out of control so that the pulse width of the watchdog signal WDS becomes too large when the power switch 103 is closed, a reset pulse signal RST is generated so as to initialize the main CPU 10 to restart. Note that the self holding instruction for the power supply relay 102 may use a control output signal of the main CPU 10.

An analog input interface circuit 114*a* that is mainly made up of a noise filter circuit is connected between the first analog sensor 104*a* and a first analog input port AI1 of the main control circuit portion 110A so that digital converted values of various types of analog input signals are supplied to the main CPU 10 via the multichannel AD converter 13.

A digital input interface circuit 115*a* that is mainly made up of a signal voltage level conversion circuit and a noise filter circuit is connected between the first switch sensor 105*a* and a first digital input port DI1 of the main control circuit portion 110A so that ON/OFF information of various types of switch signals to the main CPU 10.

An output interface circuit 116*a* that is mainly made up of a power transistor is disposed between an output port DO1 of the main control circuit portion 110A and the first electric load 106*a* so as to perform drive control of various types of electric loads in response to the control output signal from the main CPU 10.

A logical OR circuit 117 drives the warning display unit 107 based on a logical OR output of a first error signal ER1 generated by the main CPU 10 and a second error signal ER2 generated by a sub CPU 20 that is described later.

A logical inverter element 118 is an interface circuit for generating a power switch signal IGS to be a logical level "L" when the power switch 103 is closed and for supplying the generated signal to the main CPU 10.

A buffer amplifier 119 is made up of an operational amplifier in which an output voltage of the main power supply circuit 112 is applied to a noninverting input terminal thereof, and an output voltage of the buffer amplifier 119 is applied to an inverting input terminal thereof as a negative feedback input voltage. The buffer amplifier 119 supplies a drive power to a part of the first analog sensor 104*a* and protects the main power supply circuit 112 from being damaged even if an abnormal short circuit occurs in external wiring.

The sub control circuit portion 120A is made up of the sub CPU 20 as a microprocessor, a second program memory 21A such as a mask ROM memory, a RAM memory 22 for operational processing, a multichannel AD converter 23, a serial-to-parallel converter 24, a low speed clock signal source 25 and a clock signal switch circuit 26. The serial-to-parallel converter 14 and the serial-to-parallel converter 24 are connected to each other via a serial interface so that they can exchange control and monitor signals.

The sub CPU 20 that performs 8 bit operation works in synchronization with a middle speed clock signal from a middle speed clock signal source 121 using a ceramic resonator or a crystal resonator. The operating speed of the sub CPU 20 is 16 MHz, for instance. The accessible memory area is approximately 32 KBytes, for instance. As a result, power consumption thereof is relatively small like 70 mW, for instance, but it is not suitable for long period operation in a parked state.

In contrast, the low speed clock signal source 25 is made up of a ring oscillator that is a semiconductor oscillator having a structure in which an odd number of logical inverter elements are connected in a slave circulating manner, for instance. When a clock signal of the sub CPU 20 is switched by the clock signal switch circuit 26 from the middle speed clock signal source 121 to the low speed clock signal source 25, the sub CPU 20 performs low speed operation at 500 KHz, for instance. The power consumption of the sub CPU 20 in this state is controlled to be an extremely small value like 10 mW, for instance.

A sub power supply circuit 122 is supplied with electric power from the on-vehicle battery 101 directly and supplies a second control voltage Vcc2 of DC 5 V to the sub control circuit portion 120A. The sub power supply circuit 122 also supplies a second reference voltage Vref2 via a power supply switch element 130 that is described later. Note that the sub CPU 20, the first program memory 21A, the RAM memory 22, the multichannel AD converter 23, the serial-to-parallel converter 24, the low speed clock signal source 25 and the clock signal switch circuit 26 within the sub control circuit portion 120A are supplied with electric power from the second control voltage Vcc2 while the second reference voltage Vref2 is connected to a reference voltage terminal that defines a full scale input voltage of the multichannel AD converter 23.

An analog input interface circuit 124*b* that is mainly made up of a noise filter circuit is connected between the second analog sensor 104*b* that is a pressure sensor disposed in a fuel tank (not shown) and the second analog input port AI2 of the sub control circuit portion 120A, for instance, so as to deliver a digital converted value of a detected pressure to the sub CPU 20 via the multichannel AD converter 23. In addition, a part of the first analog sensor 104*a* supplied to the analog input interface circuit 114*a* is also connected to the second analog input port AI2 of the sub control circuit portion 120A so as to deliver digital converted values of various types of analog input signals to the sub CPU 20 via the multichannel AD converter 23. Those analog input signals become effective when the power switch 103 is closed.

An output interface circuit 126*b* is disposed between an output port DO2 of the sub control circuit portion 120A and the second electric load 106*b* that is a solenoid for driving a ventilating valve of the fuel tank, for instance. The output interface circuit 126*b* responds to the control output signal of the sub CPU 20 so as to perform drive control of the second electric load 106*b*. Note that the output interface circuit 126*b* is made up of an output transistor 127*a* and a drive resistor 127*b* connected to a base circuit of the output transistor 127*a*.

A buffer amplifier 129 responds to an output voltage of a power supply switch element 130 that is described later, so as to supply the same voltage as the output voltage to a part of the second analog sensor 104*b* as a drive power and to protect the sub power supply circuit 122 from being damaged even if an abnormal short circuit occurs in external wiring.

The power supply switch element 130 is a PNP transistor connected to an output terminal of the sub power supply circuit 122 so as to generate the second reference voltage Vref2, and the transistor is driven via a base resistor 131, a diode 132 and a drive transistor 133. The drive transistor 133 is driven and is turned on by a power supply control signal DR2 generated by the sub CPU 20 via a drive resistor 134.

Voltage dividing resistors 135 and 136 are connected to the on-vehicle battery 101 via a power supply switch element 137, whereby a voltage that is proportional to an output voltage of the on-vehicle battery 101 is supplied to the multichannel AD converter 23 via the second analog input port AI2.

The power supply switch element 137 as a PNP transistor is driven via a base resistor 138, a diode 139 and the drive transistor 133, and the drive transistor 133 is driven and is turned on via the drive resistor 134 by the power supply control signal DR2 generated by the sub CPU 20.

Note that the first switch sensor 105*a* and the first electric load 106*a* are supplied with electric power via the power switching element 102*a*. In contrast, the second electric load 106*b* is connected directly to the on-vehicle battery 101, but the second electric load 106*b* is not supplied with electric power until the output transistor 127*a* is closed. However, there can be adopted another structure for safely in which the second electric load 106*b* is connected to the on-vehicle battery 101 via the power supply switch element 137.

(2) Detailed Description of Actions and Operations

Figure 2:
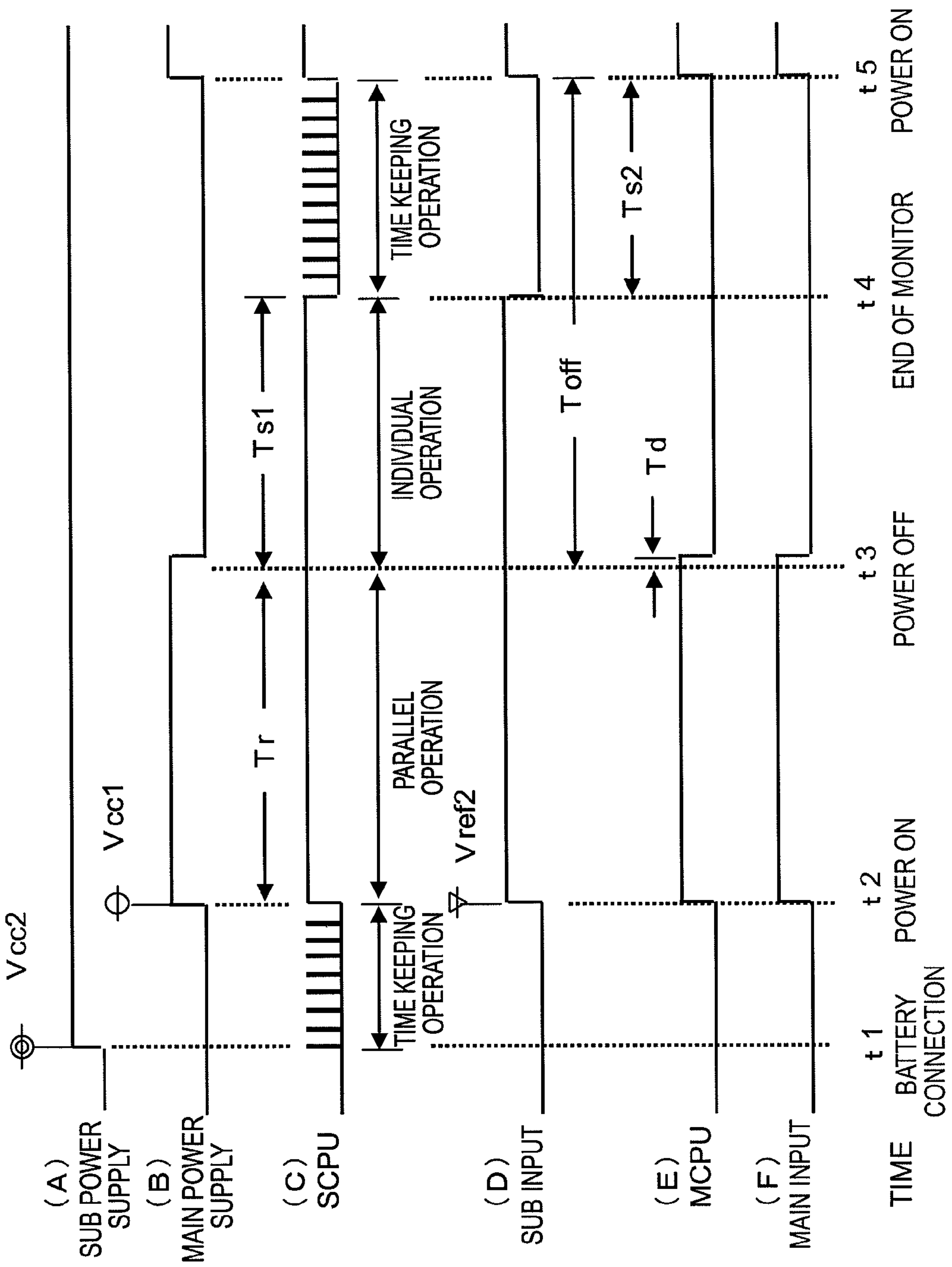
FIG. 2 is a transition timing chart of operating modes of the on-vehicle electronic control device illustrated in FIG. 1.

Next, general operation of the on-vehicle electronic control device illustrated in FIG. 1 is described with reference to FIG. 2 that is a transition timing chart of operating modes. (A) of FIG. 2 illustrates output characteristics of the sub power supply circuit 122. When the on-vehicle battery 101 is connected to the on-vehicle electronic control device 100A at time point t1, the sub power supply circuit 122 generates the second control voltage Vcc2 so that the sub CPU 20 starts its operation.

(B) of FIG. 2 illustrates output characteristics of the main power supply circuit 112. When the power switch 103 is closed at time point t2, the exciting coil 102*b* of the power supply relay 102 is driven via the power source control circuit 113 so that the power switching element 102*a* is closed. Then, the main power supply circuit 112 is supplied with electric power so that the main power supply circuit 112 generates the first control voltage Vcc1 for the main CPU 10, whereby the main CPU 10 starts its operation. When the power switch 103 is opened at time point t3, the main CPU 10 stops its operation after delay time Td that is described later. As a result, the watchdog signal WDS is stopped so that the self holding action of the power source control circuit 113 is cancelled. The power supply relay 102 is turned off, and thus the output voltage of the main power supply circuit 112 drops so that the first control voltage Vcc1 is turned off.

(C) of FIG. 2 illustrates operating modes of the sub CPU 20. During the time point t1 and the time point t2, time keeping operation that is a third operating mode is performed. During the time point t2 and the time point t3, parallel operation that is a first operating mode is performed while the sub CPU 20 cooperates with the main CPU 10 to bear a part of general control and monitoring. Even if the main CPU 10 is stopped after the time point t3, the sub CPU 20 continues individual operation as a second operating mode and changes its mode to the time keeping operation as the third operating mode when the parked state monitoring of the parked vehicle is finished at time point t4. Further, the time period between the time points t2 and t3 is illustrated as parallel operation time Tr, the time period between the time points t3 and t4 is illustrated as individual operation time Ts1, the time period between the time point t4 and time point t5 at which the power switch 103 is again closed is illustrated as simple parked time Ts2, and the time period between the time points t3 and t5 is illustrated as parking time Toff=Ts1+Ts2.

(D) of FIG. 2 illustrates voltage characteristics of parked state monitoring power supply for the second analog sensor 104*b* to be an input signal of the sub CPU 20, the analog input interface circuit 124*b*, and the second reference voltage Vref2 and the like. When the main CPU 10 starts its operation at the time point t2, the sub CPU 20 generates the power supply control signal DR2 and the power supply switch element 130 is closed via the drive transistor 133, whereby the sub power supply circuit 122 supplies a stabilized voltage like DC 5 V, for instance. However, when the individual operation of the sub CPU 20 is finished at the time point t4, the power supply control signal DR2 stops and the power supply switch element 130 is opened so that useless discharge to an input circuit for the parked state monitoring is stopped.

(E) of FIG. 2 illustrates operating states of the main CPU 10, which starts its operation when electric power is supplied at the time point t2 and ends its operation after performing various types of saving process operations and after the delay time Td when the power switch 103 is opened at the time point t3.

(F) of FIG. 2 illustrates voltage characteristics of operation controlling power supply for the first analog sensor 104*a*, the analog input interface circuit 114*a*, the digital input interface circuit 115*a*, the first reference voltage Vref1 and the like. This power supply voltage becomes the output voltage of the main power supply circuit 112 itself.

With reference to FIG. 1 again, when the power switch 103 is closed so that the main CPU 10 and the sub CPU 20 cooperate with each other, the main CPU 10 is supplied with the analog input signal from the first analog sensor 104*a* and an ON/OFF signal from the first switch sensor 105*a*. Further, the drive control of the first electric load 106*a* is performed in accordance with contents of an input and output control program stored in the first program memory 11A, and the sub CPU 20 is supplied with a part of the analog signal from the first analog sensor 104*a*, the input signal from the pressure sensor of the fuel tank as the second analog sensor 104*b* and a power supply voltage monitor signal that is proportional to the output voltage of the on-vehicle battery 101, which is supplied via the power supply switch element 137 that is driven and is turned on by the power supply control signal DR2.

A part of the analog signal supplied from the first analog sensor 104*a* to the sub CPU 20 is a signal detected by a pair of gas pedal position sensors and a pair of throttle position sensors that are disposed as a duplexed system. The sub CPU 20 judges presence or absence of an abnormal state like a break or a short circuit of the gas pedal position sensor or the throttle position sensor based on the detection signal. If an abnormal state is detected, the second error signal ER2 is generated so as to cut off a power supply circuit of a motor for controlling a throttle valve opening degree or to drive the warning display unit 107.

The sub CPU 20 also monitors whether or not pressure of the fuel tank obtained from the analog input interface circuit 124*b* indicates an abnormal value so as to judge presence or absence of an abnormal state like a break or a short circuit of the pressure sensor circuit, or measures power supply voltage of the on-vehicle battery 101 by the power supply voltage monitor signal obtained from the voltage dividing resistors 135 and 136 so as to transmit the measured value to the main CPU 10 via the serial-to-parallel converters 24 and 14.

On the other hand, when the power switch 103 is opened, the individual operation of the sub CPU 20 starts so that detection operation of a fuel evaporation starts as described later. The input signal that becomes effective in this individual operating state becomes only the power supply voltage monitor signal obtained from the second analog sensor 104*b* and the voltage dividing resistors 135 and 136, and thus power consumption can be reduced. When the fuel evaporation detection is finished, the clock signal of the sub CPU 20 is switched to the low speed signal from the low speed clock signal source 25 and is further changed to a time keeping operating mode with low power consumption.

Figure 3:
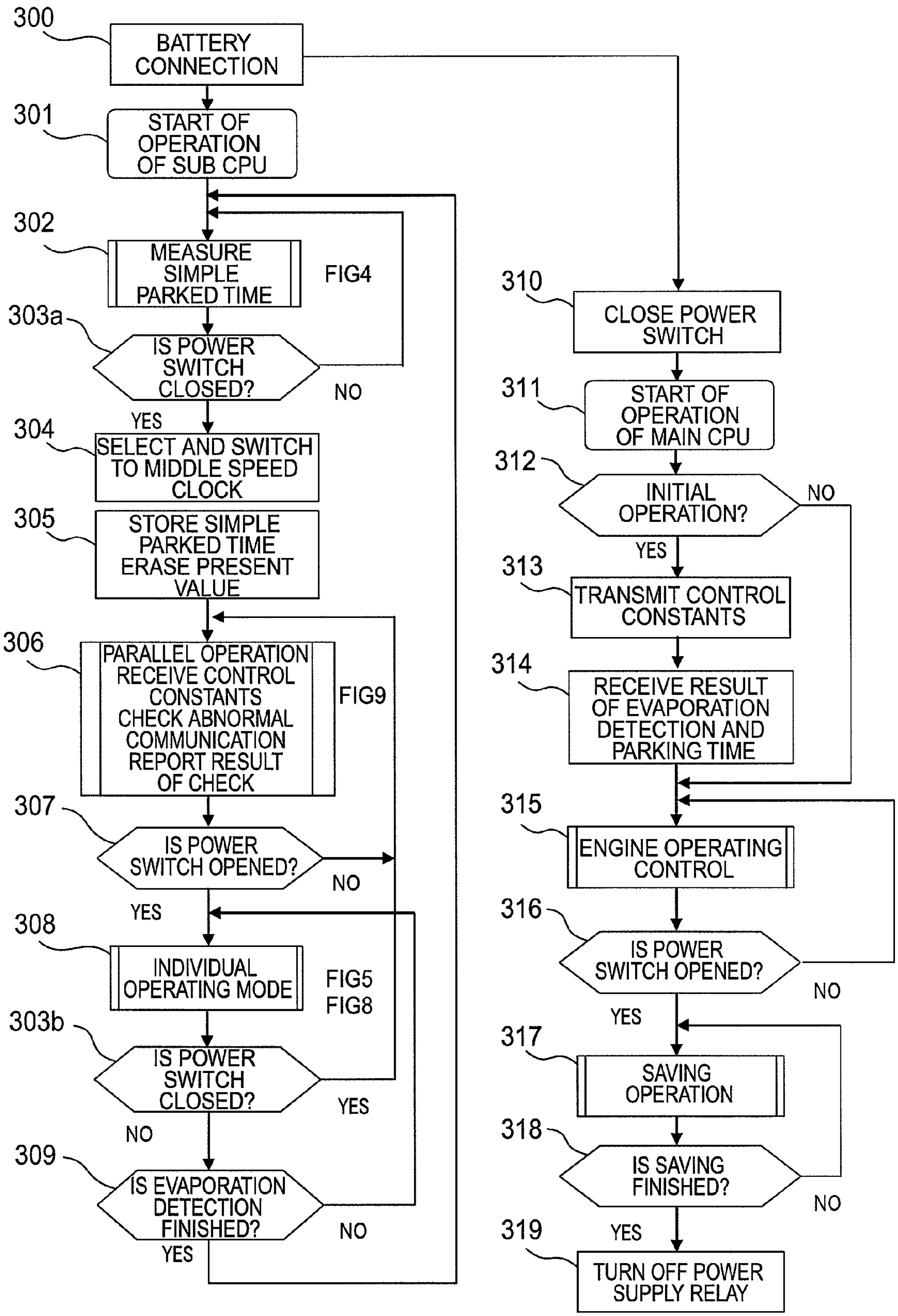
FIG. 3 is a flowchart of general operation of the on-vehicle electronic control device illustrated in FIG. 1.

Next, FIG. 3 that is a flowchart of general operation of the on-vehicle electronic control device illustrated in FIG. 1 is described. As illustrated in FIG. 3, when the on-vehicle battery 101 is connected to the on-vehicle electronic control device 100A in Step 300, the sub CPU 20 starts its operation in Step 301. The next Step 302 is a time keeping step of the simple parked time Ts2 that is described later with reference to FIG. 4. In the next Step 303*a*, it is monitored whether or not the power switch 103 is closed. If the power switch 103 is still opened, judging of NO is performed in Step 303*a*, and the process goes back to Step 302, in which the time keeping of the simple parked time Ts2 is continued. If the power switch 103 is closed, judging of YES is performed in Step 303*a*, and the process goes to Step 304.

Note that an opened or closed state of the power switch 103 is judged based on communication information transmitted from the main CPU 10 via the serial-to-parallel converters 14 and 24, but it may be supplied directly from the power switch 103 to the input port of the sub CPU 20 via the interface circuit.

In Step 304, a switch instruction is issued to the clock signal switch circuit 26, whereby the low speed clock signal source 25 used in Step 302 is switched to the middle speed clock signal source 121. The next Step 305 is a step in which the simple parked time Ts2 as a result of the time keeping in Step 302 is stored in a predetermined address of the RAM memory 22, and then a current value of a time keeping counter is reset.

The next Step 306 is a parallel operation step, and details thereof are described later with reference to FIG. 9 of Second Embodiment. In First Embodiment, it detects at least presence or absence of an abnormal state in a communication response of the main CPU 10 so as to monitor the operating state of the main CPU 10 and transmits a operation result of the sub CPU 20 in the second and third operating modes in Steps 308 and 302 to the main CPU 10. It further receives control constant transmitted by the main CPU 10 in Step 313 that is described later. Note that the monitoring function of the operating state of the main CPU 10 is stopped in the second and third operating modes in Steps 308 and 302.

In the next Step 307, it is monitored whether or not the power switch 103 is opened. If the power switch 103 is still closed, judging of NO is performed in Step 307 so as to continue the parallel operation. If the power switch 103 is opened, judging of YES is performed in Step 307, and the process goes to Step 308.

In the next Step 308 is an individual operation step that is described later with reference to FIGS. 5 and 8. In the next Step 303*b*, it is judged whether or not the power switch 103 is closed. If the power switch 103 is closed, the process goes back to Step 306. If the power switch 103 is still opened, judging of NO is performed and the process goes to Step 309.

In Step 309, it is judged whether or not the fuel evaporation detection in Step 308 is finished. If the fuel evaporation detection is not finished, judging of NO is performed and the process goes back to Step 308. If the fuel evaporation detection is finished, judging of YES is performed and the process goes back to Step 302.

On the other hand, if the power switch 103 is closed in Step 310, the main CPU 10 starts its operation in Step 311. The next Step 312 is a judging step in which it is judged whether or not the operation is the first time after the power switch 103 is closed based on an operating state of a flag (not shown). If the operation is the first time, judging of YES is performed and the process goes to Step 313. If the operation is not the first time, judging of NO is performed and the process goes to Step 315. Step 313 is a step in which the control constant stored in the first program memory 11A is transmitted to the RAM memory 22.

Figure 4:
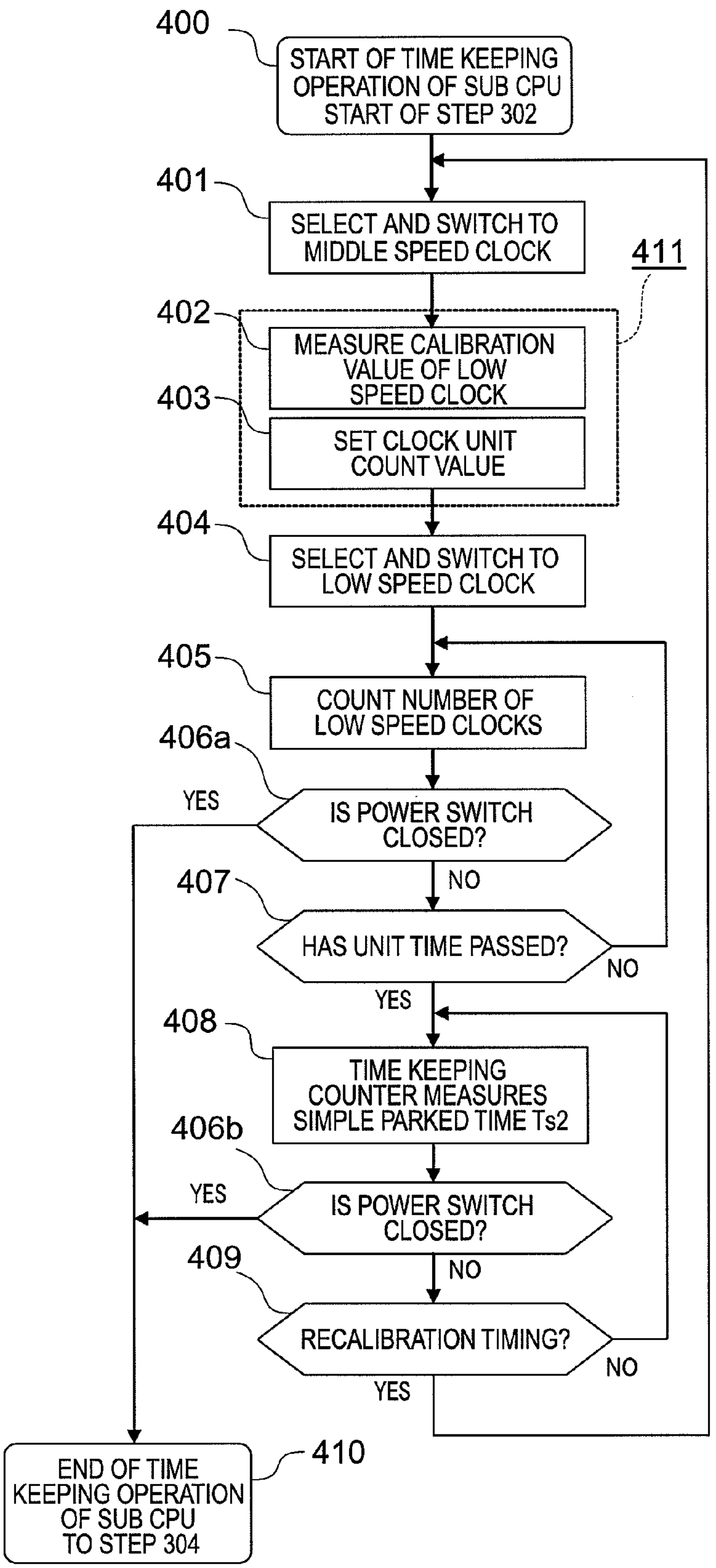
FIG. 4 is a flowchart of time keeping operation of the on-vehicle electronic control device illustrated in FIG. 1.
Figure 5:
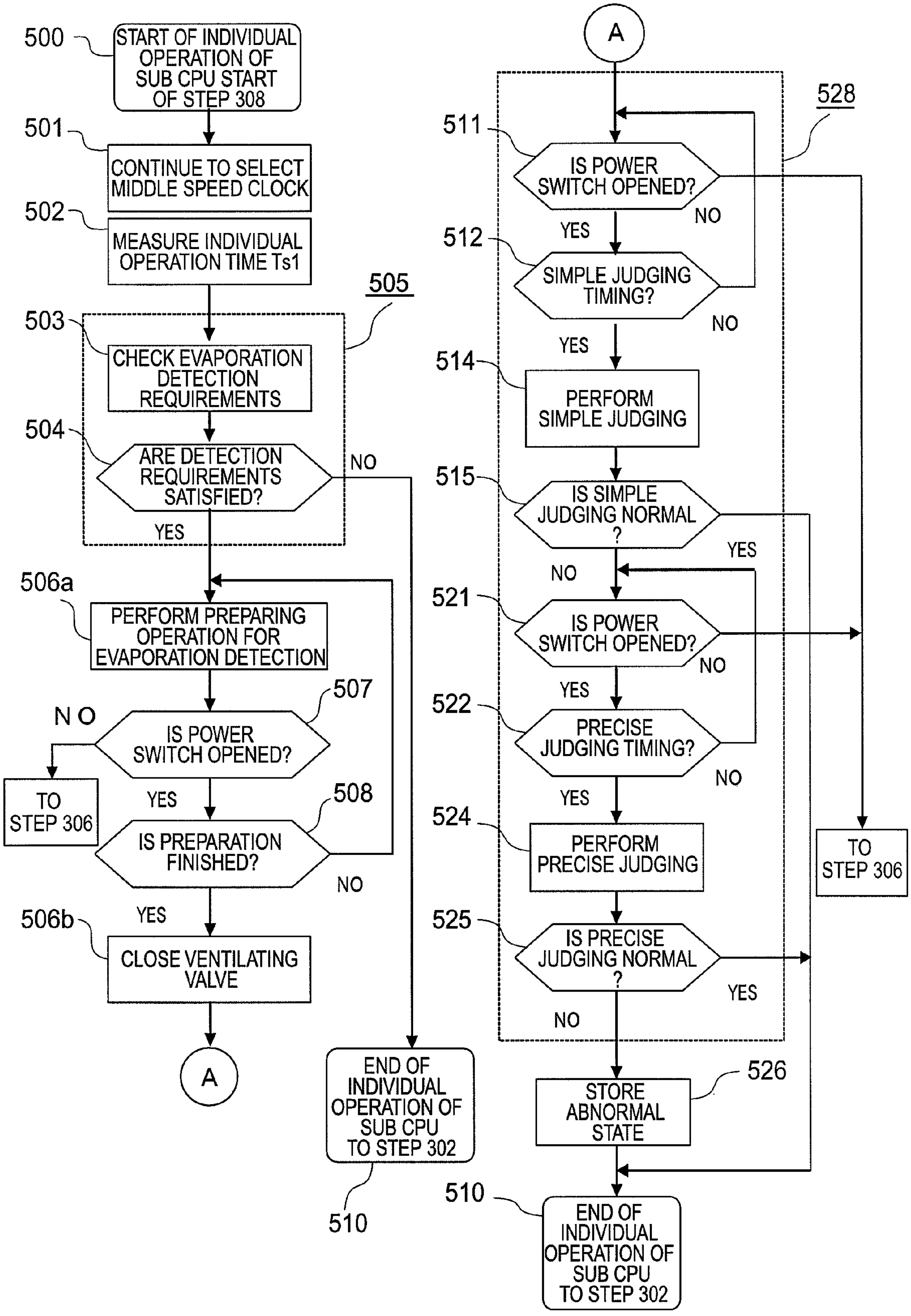
FIG. 5 is a flowchart of individual operation of the on-vehicle electronic control device illustrated in FIG. 1.

In the next Step 314, the evaporation detection result stored in Step 526 of FIG. 5 is received from the sub CPU 20. Further, the simple parked time Ts2 measured in Step 408 of FIG. 4 and a value of the individual operation time Ts1 measured in Step 502 of FIG. 5 are received from the sub CPU 20, and a total sum thereof is stored in the RAM memory 12 as the parking time Toff. After Step 314, the process goes to Step 315.

The next Step 315 is an operation control step of an on-vehicle engine, and in the next Step 316, it is monitored whether or not the power switch 103 is opened. If the power switch 103 is still closed, judging of NO is performed in Step 316 and the process goes back to Step 315 so as to continue the engine control. If the power switch 103 is opened, judging of YES is performed in Step 316 and the process goes to Step 317.

Step 317 is a saving operation step in which operation learning information obtained in Step 315, abnormal state occurring history information and the like are transmitted to a nonvolatile data memory (not shown) and are saved in the same. The next Step 318 is a judging step in which it is judged whether or not the saving operation is finished. If the saving operation is not finished, judging of NO is performed and the process goes back to Step 317. If the saving operation is finished, judging of YES is performed and the process goes to Step 319. In Step 319, the watchdog signal WDS is stopped, and consequently the self holding instruction by the power source control circuit 113 is cancelled, whereby the power supply relay 102 is turned off.

Next, FIG. 4 that is a flowchart of the time keeping operation in the on-vehicle electronic control device illustrated in FIG. 1 is described. In FIG. 4, Step 400 is a step for the sub CPU 20 to start the time keeping operation to keep the simple parked time Ts2 after the individual operation. Step 400 corresponds to the initial step in Step 302 of FIG. 3. The next Step 401 is a step of generating a switch instruction signal that is used for connecting the middle speed clock signal from the middle speed clock signal source 121 to a clock signal input terminal of the sub CPU 20 by the clock signal switch circuit 26.

The next Step 402 is a step of measuring a clock signal period $\tau 1$ of the low speed clock signal source 25 supplied to the input port of the sub CPU 20 with reference to a clock signal period $\tau 2$ of the middle speed clock signal source 121. If the middle speed clock signal is generated N times during the clock signal period $\tau 1$, for instance, "$\tau 1 = N \times \tau 2$" holds so that a calibration value coefficient N can be obtained. Note that the clock period $\tau 1$ has a variation of e.g., ±20% due to an individual variation of the product or an environment temperature variation while one clock period $\tau 2$ maintains a predetermined value that is sufficiently accurate. The next Step 403 is a step of setting a count value of the clock unit. For instance, a reference number of times of occurrence N0 of the low speed clock signal during the period of a clock unit $\tau 0$ of one minute is derived from "$N0 = \tau 0/\tau 1 = 60/(N \times \tau 2)$".

The next Step 404 is a step of generating a switch instruction signal for connecting the low speed clock signal from the low speed clock signal source 25 to the clock signal input terminal of the sub CPU 20 by the clock signal switch circuit 26. The next Step 405 is a step for a unit time keeping counter to count the number of low speed clock signals. In the next Step 406*a*, it is judged whether or not the power switch 103 is closed. If the power switch 103 is still opened, judging of NO is performed and the process goes to Step 407. If the power switch 103 is closed, judging of YES is performed and the process goes to Step 410 of finishing the operation. After Step 410 of finishing the operation, the process goes to Step 304 of FIG. 3.

In Step 407, it is judged whether or not the current value counted in Step 405 has reached the reference number of times of occurrence N0 calculated in Step 403. If the current value has not reached, judging of NO is performed and the process goes back to Step 405 so as to continue to count the number of low speed clock signals. For instance, if the clock unit $\tau 0$ of one minute elapses so that the current value of the unit time keeping counter reaches the reference number of times of occurrence N0, judging of YES is performed and the process goes to Step 408.

The next Step 408 is a step for the time keeping counter to count the number of times every time when the judging of YES is performed in Step 407, so as to keep the simple parked time Ts2. The simple parked time means parking time except for the period of the individual operation of the sub CPU 20 in the state where the power switch 103 is opened so that the engine is stopped. In the next Step 406*b*, it is judged whether or not the power switch 103 is closed. If the power switch 103 is still opened, judging of NO is performed and the process goes to Step 409. If the power switch 103 is closed, judging of YES is performed and the process goes to Step 410 of finishing the operation. After Step 410 of finishing the operation, the process goes to Step 304 of FIG. 3.

Step 409 is a step of judging whether or not recalibration timing has come. If the recalibration timing has not come, judging of NO is performed and the process goes back to Step 408. If the recalibration timing has come, judging of YES is performed and the process goes back to Step 401. Note that a part or a whole of Steps 401 to 409 are repeated in a cyclic manner if the power switch 103 is opened, and in Step 409, the judging of YES is performed once every several minutes so as to perform the step block 411 serving as time keeping calibration means made up of Steps 402 and 403. In addition, a cycle period of Steps 401 to 409 is several milliseconds at longest, and the process can go back to Step 304 of FIG. 3 promptly when the power switch 103 is closed.

Next, FIG. 5 that is a flowchart of the individual operation of the on-vehicle electronic control device illustrated in FIG. 1 is described. In FIG. 5, Step 500 is a step for the sub CPU 20 to start the individual operation, which corresponds to the initial step of Step 308 illustrated in FIG. 3. The next Step 501 is a step of generating the switch instruction signal for connecting the middle speed clock signal from the middle speed clock signal source 121 to the clock signal input terminal of the sub CPU 20 by the clock signal switch circuit 26.

The next Step 502 is a step for an individual operation time keeping counter to keep a lapse time of the individual operation by counting the number of frequency division pulses of the middle speed clock signal. Further, when the individual operation time is measured, similarly to the time keeping operation illustrated in FIG. 4, the time keeping can be performed based on the number of occurrence times of the low speed clock signals while the low speed clock signal period is calibrated with reference to the middle speed clock signal as a reference time.

In the next Step 503, detection requirements about whether or not the fuel evaporation detection should be performed are checked. If the detection requirements are satisfied in Step 503, judging of YES is performed in the next Step 504, and the process goes to Step 506*a*. If the detection requirements are not satisfied, judging of NO is performed in Step 504, and the process goes to Step 510 for finishing the operation. Then, the process goes to Step 302 of FIG. 3. Note that the step block 505 including Steps 503 and 504 corresponds to requirement judging means, which omits execution of evaporation detection means this time if at least the lapse time from the last evaporation judging to the present time is a predetermined time or shorter, and goes to Step 510 for finishing the operation. The requirement judging means further responds to an abnormal state of a break or a short circuit in the input and output circuit of the sub CPU 20, and an abnormal state of voltage decrease in the on-vehicle battery 101, so as to omit execution of the evaporation detection means this time and to go to Step 510 for finishing the operation.

Step 506*a* is a step of performing preparation for the fuel evaporation detection. In this Step 506*a*, the second electric load 106*b* that is the solenoid for driving the ventilating valve is driven so that the fuel tank is opened to the air. In the next Step 507, it is judged whether or not the power switch 103 is opened. If the judging in Step 507 is YES, which means that the power switch 103 is opened, the process goes to Step 508. If the power switch 103 is closed, judging of NO is performed and the process goes to Step 306 of FIG. 3.

In Step 508, it is judged whether or not the fuel tank has been opened to the air due to elapsing of a predetermined period of time. If the fuel tank has not been opened to the air, judging of NO is performed and the process goes to Step 506*a*. If the fuel tank has been opened to the air, judging of YES is performed and the process goes to Step 506*b* in which the ventilating valve is closed, and then the process goes to Step 511. In Step 511, it is judged whether or not the power switch 103 is opened. If the judging in Step 511 is YES, which means that the power switch 103 is opened, judging of YES is performed and the process goes to Step 512. If the power switch 103 is closed, judging of NO is performed and the process goes to Step 306 of FIG. 3.

In Step 512, it is judged whether or not to be simple judging timing. If it is not the simple judging timing, judging of NO is performed and the process goes back to Step 511. If it is the simple judging timing, judging of YES is performed and the process goes to Step 514. In Step 514 as simple judging means, simple judging of the fuel evaporation detection is performed, and the process goes to Step 515. In Step 515, if a result of the simple judging in Step 514 is normal, judging of YES is performed and the process goes to Step 510 of finishing the operation. If a normal judging cannot be performed as a result of the simple judging, judging of NO is performed and the process goes to Step 521. Note that the simple judging means performs the normal judging if the pressure of the fuel tank detected by the pressure sensor maintains a first pressure value close to an ideal normal pressure in a first time period after the power switch 103 is opened. It is judged whether or not the first time period has passed in Step 512, and it is judged whether or not the first pressure value has been maintained in Step 514.

Step 521 is a step of judging whether or not the power switch 103 is opened. If the judging in Step 521 is YES, which means that the power switch 103 is opened, the process goes to Step 522. If the power switch 103 is closed, judging of NO is performed and the process goes to Step 306 of FIG. 3. In Step 522, it is judged whether or not to be precise judging timing. If it is not the precise judging timing, judging of NO is performed and the process goes back to Step 521. If it is the precise judging timing, judging of YES is performed and the process goes to Step 524.

In Step 524 to be precise judging means, the precise judging of the fuel evaporation detection is performed, and the process goes to Step 525. If a result of the precise judging in Step 524 is normal, judging of YES is performed in Step 525 and the process goes to Step 510 of finishing the operation. If the normal judging cannot be performed as a result of the precise judging, judging of NO is performed and the process goes to Step 526.

Note that the precise judging means is performed if the normal judging has not been performed by the simple judging means. The precise judging means performs the normal judging if the pressure detected by the pressure sensor maintains a second pressure value during a second time period that is longer than the first time period. This second pressure value is a pressure that is different from the ideal normal pressure but enables to perform acceptance judging. It is judged whether or not the second time period has passed in Step 522, and it is judged whether or not the second pressure value has been maintained in Step 524.

In Step 526, occurrence of the abnormal state is stored, and the process goes to Step 510 of finishing the operation. The fuel evaporation abnormal state stored in Step 526 is reported and transmitted to the main CPU 10 when the power switch 103 is closed.

A step block 528 including Steps 511 to 525 corresponds to the evaporation detection means. When the simple judging means 514 performs the normal judging, execution of the precise judging means 524 is omitted. The sub CPU 20 goes out from the individual operating mode in a short time, and the process goes to Step 302 of FIG. 3 via Step 510 of finishing the operation, whereby the time keeping operation of the low power consumption is started. Note that the first time period described above is 10 minutes, for instance, and the second time period is 50 minutes, for instance. The first pressure value is 100±5% of the ideal normal value, and the second pressure value is 100±10% of the same. Judging control constants thereof are transmitted to the RAM memory 22 in advance in Step 313 of FIG. 3.

(3) Main Points and Features of First Embodiment

As understood from the above description, the on-vehicle electronic control device 100A of First Embodiment of the present invention includes the main control circuit portion 110A and the sub control circuit portion 120A. The main control circuit portion 110A is supplied with electric power from the on-vehicle battery 101 via the power switching element 102*a* and the main power supply circuit 112 responding to the operation of the power switch 103, and includes the microprocessor as the main CPU 10 with the high speed and large-capacity memory area that responds to operating states of the plurality of input sensors 104*a* and 105*a*, and the contents of the first program memory 11A for driving a plurality of electric loads 106*a*. The sub control circuit portion 120A is supplied with electric power continuously from the on-vehicle battery 101 via the sub power supply circuit 122, and includes the microprocessor as the sub CPU 20 that is connected to the main CPU 10 via the serial interface and has the middle speed and the small-capacity memory area compared with the main CPU 10. The sub CPU 20 has the first, second and third operating modes 306, 308 and 302 for responding to the control program stored in the second program memory 21A, the middle speed clock signal source 121 that is used in a selective and switched manner, the low speed clock signal source 25, and the power supply switch element 130 for supplying electric power to the input interface circuit 124*b*.

The first operating mode 306 is operated in parallel with the main CPU 10 in the state where the power switch 103 is closed so as to communicate information with the main CPU 10 as the parallel operating mode. The sub CPU 20 detects at least presence or absence of an abnormal state of a communication response in the main CPU 10 for monitoring the operating state of the main CPU. The sub CPU 20 operates based on the middle speed clock signal generated by the middle speed clock signal source 121.

The second operating mode 308 is the individual operating mode that operates during a predetermined period of time after the main CPU 10 has stopped its operation while the power switch 103 is opened. In this period, the power supply switch element 130 that makes a part of the input and output signals of the sub CPU 20 effective is closed. The sub CPU 20 performs the parked state monitoring of the parked vehicle based on the part of the input and output signals that is made to be effective so as to measure the lapse time after the power switch 103 has been opened. The sub CPU 20 works based on the middle speed clock signal generated by the middle speed clock signal source 121.

The third operating mode 302 is the time keeping only mode that operates during the period of time after the individual operation is finished until the power switch 103 is closed again while the power supply switch element 130 is opened, so as to measure the lapse time after the second operating mode 308 has been finished. The sub CPU 20 works based on the low speed clock signal generated by the low speed clock signal source 25.

In the second and third operating modes 308 and 302, the monitoring function in the operating state of the main CPU 10 is stopped, and the operation results of the sub CPU 20 in the second and third operating modes 308 and 302 are transmitted to the main CPU 10 in the first operating mode 306.

In addition, the middle speed clock signal source 121 is a clock signal source having relatively high accuracy using a ceramic resonator or a crystal resonator while the low speed clock signal source 25 is a semiconductor ring oscillator having low power consumption and low accuracy. The second program memory 21A further includes a control program to be the time keeping calibration means 411. The time keeping calibration means 411 regularly enables the middle speed clock signal source 121 in the third operating mode 302 so as to measure the clock signal period $\tau 1$ of the low speed clock signal source 25 with reference to the clock signal period $\tau 2$ of the middle speed clock signal source 121. The sub CPU 20 performs the time keeping operation based on the measured low speed clock signal period $\tau 1$.

In this way, the low speed clock signal source is made up of the ring oscillator and performs the time keeping calibration in comparison with the middle speed clock signal period. Therefore, the low speed clock signal source has a feature that the inexpensive and low power consumption semiconductor ring oscillator is used while aged deterioration in accuracy of measuring time and environment temperature variation are corrected so that high accuracy of time can be obtained.

In addition, the sub CPU 20 is supplied with at least a digital converted value of the pressure sensor 104*b* for the fuel tank as the parked state monitoring of a vehicle in the second operating mode 308, and the second program memory 21A further includes a control program to be the evaporation detection means 528. The evaporation detection means 528 monitors a variation of pressure in the fuel tank in the second operating mode 308 so as to judge presence or absence of fuel evaporation. In the first operating mode 306, the sub CPU 20 transmits the presence or absence of an abnormal state of the fuel evaporation detected by the evaporation detection means 528 to the main CPU 10.

Thus, the sub CPU that performs the fuel evaporation detection while the power is turned off transmits the presence or absence of an abnormal state to the main CPU when the power is turned on. Therefore, the sub CPU, which has not been used effectively after the main power is opened in the conventional structure, can be used effectively so that the fuel evaporation detection can be performed by an inexpensive structure. In addition, it is not necessary to activate the main CPU while the main power is turned off. It is sufficient that the low power consumption sub CPU performs the fuel evaporation detection and transmits a result of the detection to the main CPU when the main power is turned on. Thus, a load on the main CPU can be reduced by the function sharing, and the sub CPU performs not only the time keeping operation but also extended functions so that power consumption of the on-vehicle battery in a non-charged state can be reduced.

In addition, the control output terminal of the sub CPU 20 is connected to a solenoid 106*b* for driving the ventilating valve, and the evaporation detection means 528 further judges presence or absence of fuel evaporation by monitoring a variation of pressure in the fuel tank sealed after being once opened to the air by the solenoid 106*b* for driving the ventilating valve in the second operating mode 308.

Thus, the control output terminal of the sub CPU is connected to the solenoid for driving the ventilating valve, and the evaporation detection means monitors a variation of pressure in the fuel tank sealed after being once opened to the air by the solenoid for driving the ventilating valve in the second operating mode. Therefore, there is a feature that the sub CPU, which has not been used after the main power is opened in the conventional structure, is used effectively so as to generate an output signal for driving the ventilating valve for performing the fuel evaporation detection accurately.

In addition, a part of the control constants, which is used in the evaporation detection means 528 stored in the second program memory 21A, is stored in the first program memory 11A. The first program memory 11A stores a control program to be the control constant transmission means 313 working together with the sub CPU 20 in the first operating mode 306 and a program to be parking monitor information transmission means 314. The control constant transmission means 313 is means for transmitting the control constants for the evaporation detection written and stored in advance in the first program memory 11A to the RAM memory 22 that works together with the sub CPU 20. The parking monitor information transmission means 314 is means for the main CPU 10 to receive the fuel evaporation detection result detected by the sub CPU 20 and the measurement result of the parking time. The sub CPU 20 performs the fuel evaporation detection based on the control constants transmitted to the RAM memory 22 and the control program to be the evaporation detection means 528 stored in the second program memory 21A.

Thus, the evaporation detection control constants are transmitted from the first program memory to the second RAM memory. Therefore, there is a feature that, even if the control constants change for supporting car types, changes in control specification can be managed integrally by the first program memory by updating the control constants stored in the first program memory and transmitting the control constants to the RAM memory working together with the sub CPU for use as the control constants of the sub CPU.

In addition, the second program memory 21A further stores a control program to be requirement judging means 505 for judging whether or not the evaporation detection means 528 should be performed. The requirement judging means 505 omits execution of the evaporation detection means 528 this time if at least the lapse time from the last evaporation judging to the present time is a predetermined time or shorter, and the process goes to the third operating mode 302.

Thus, if the lapse time after the last operation is short, the evaporation detection of this time is stopped, and the process goes to the third operating mode. Therefore, frequency of the evaporation detection is controlled so that power consumption can be reduced.

In addition, the requirement judging means 505 further includes means for omitting execution of the evaporation detection means 528 this time responding to an abnormal state of a break or a short circuit concerning the input and output circuit of the sub CPU 20 and an abnormal state of a voltage decrease in the on-vehicle battery 101 and for going to the third operating mode 302.

Thus, the evaporation detection is stopped in an abnormal state of environment. Therefore, an abnormal state in which it is difficult to perform the evaporation detection is detected in advance so that useless evaporation detection is not performed, and hence power consumption can be reduced.

In addition, the second program memory 21A further stores a control program to be the simple judging means 514 and a control program to be the precise judging means 524 which concern the evaporation detection means 528. The simple judging means 514 is means for performing the normal judging if the pressure detected by the pressure sensor 104*b* maintains the first pressure value close to the ideal normal pressure in the first time period after the power switch 103 is opened and for omitting the precise judging so as to go to the third operating mode 302. The precise judging means 524 is performed when the simple judging means 514 has not performed the normal judging. The precise judging means 524 performs the normal judging if the pressure detected by the pressure sensor 104*b* maintains the second pressure value that is different from the ideal normal pressure but enables to perform the acceptance judging in the second time period that is longer than the first time period. If the detected pressure does not maintain the second pressure value, the abnormal state judging is performed and the process goes to the third operating mode 302.

Thus, two types of the judging levels are used by the simple judging means and the precise judging means. Therefore, the two types of the judging levels enable to perform the judging in short time so that evaporation detection time can be reduced and power consumption can be reduced in the normal state.

Second Embodiment

(1) Detailed Description of the Structure

Figure 6:
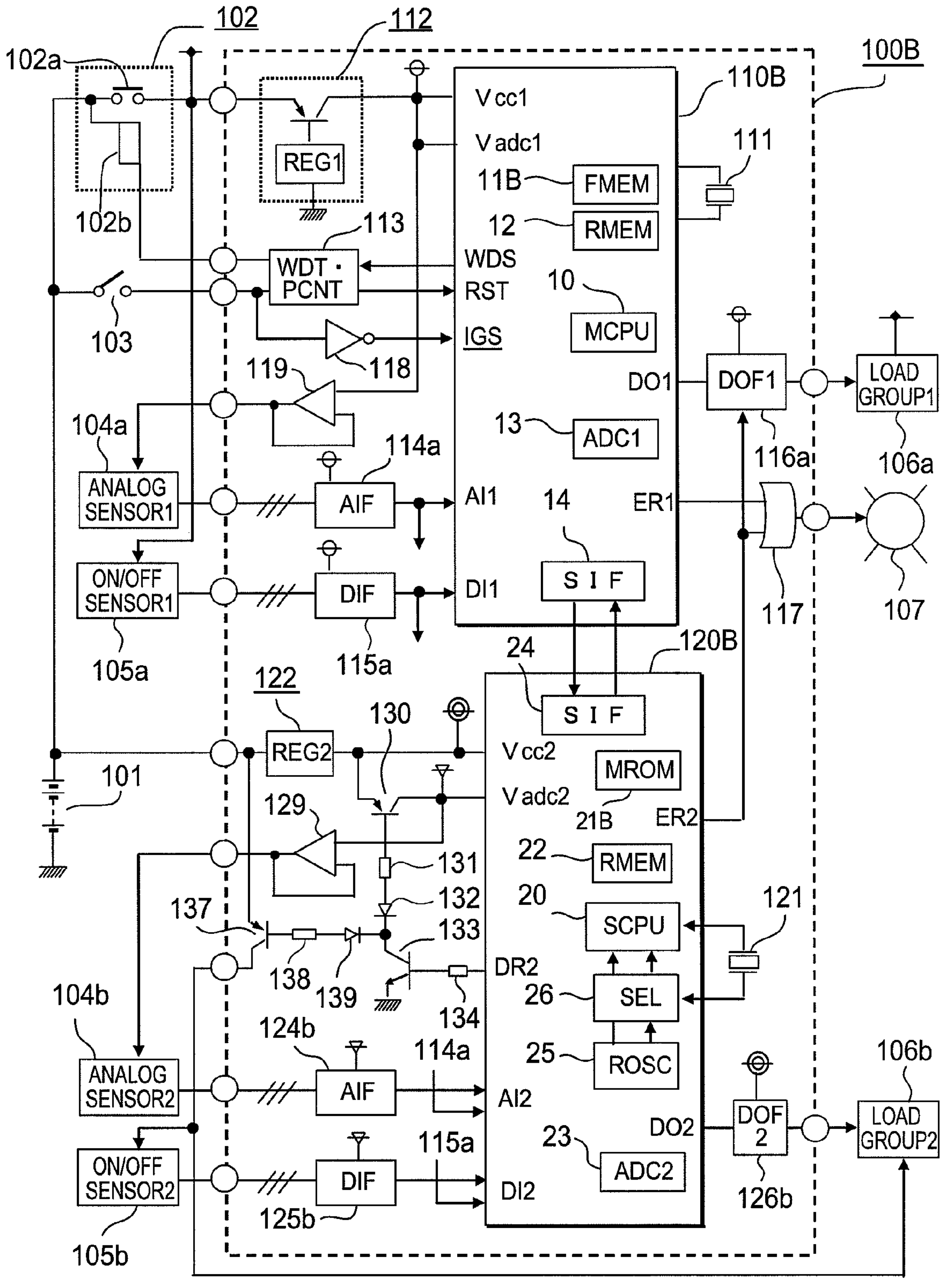
FIG. 6 is a general structural diagram of an on-vehicle electronic control device according to Second Embodiment of the present invention.

Hereinafter, an on-vehicle electronic control device according to Second Embodiment of the present invention is described. FIG. 6 is a general structural diagram of the on-vehicle electronic control device according to Second Embodiment of the present invention. In FIG. 6, a structure different from that of FIG. 1 is mainly described. Compared with the structure illustrated in FIG. 1, the structure illustrated in FIG. 6 includes additional inputs and outputs of a sub CPU and hence its bearing function is extended. Moreover, the structure is devised further to reduce power consumption of the sub CPU in an individual operation. Note that the same reference symbols denote the same parts or the equivalent parts in the drawings.

In FIG. 6, an on-vehicle electronic control device 100B mainly includes a main control circuit portion 110B and a sub control circuit portion 120B and is housed in a sealed casing (not shown). External devices connected to the on-vehicle electronic control device 100B include an on-vehicle battery 101, a power supply relay 102 including a power switching element 102*a* as an output contact and an exciting coil 102*b*, a power switch 103, first and second analog sensors 104*a* and 104*b*, first and second switch sensors 105*a* and 105*b*, first and second electric loads 106*a* and 106*b* and a warning display unit 107. More various inputs and outputs are connected to a sub CPU 20 compared with the structure illustrated in FIG. 1.

The main control circuit portion 110B includes a main CPU 10 that is a microprocessor, a first program memory 11B of a nonvolatile flash memory or the like, a RAM memory 12 for operational processing, a multichannel AD converter 13 and a serial-to-parallel converter 14. A peripheral connection circuit thereof is configured similarly to that illustrated in FIG. 1. However, a reference voltage terminal Vref1 of the multichannel AD converter 13 is connected to a power source terminal Vadc1 of the multichannel AD converter 13, and the power source terminal Vadc1 is separated from a power source terminals of the main CPU 10 and various types of memory.

The sub control circuit portion 120B includes the sub CPU 20 that is the microprocessor, a second program memory 21B of a mask ROM memory or the like, a RAM memory 22 for operational processing, a multichannel AD converter 23, a serial-to-parallel converter 24, a low speed clock signal source 25 and a clock signal switch circuit 26. The serial-to-parallel converter 14 and the serial-to-parallel converter 24 are connected to each other via a serial interface so as to exchange control and monitor signals. Note that a reference voltage terminal Vref2 of the multichannel AD converter 23 is connected to a power source terminal Vadc2 of the multichannel AD converter 23. Therefore, the power source terminal and reference voltage terminal of the multichannel AD converter 23 are supplied with electric power only when a power supply switch element 130 is closed.

The second analog sensor 104*b* includes a pressure sensor of the fuel tank, a water temperature sensor for sensing temperature of cooling water for the engine, an outside air temperature sensor for sensing environment temperature, a remaining quantity sensor for sensing remaining quantity of fuel. An analog input interface circuit 124*b* is connected between the second analog sensor 104*b* and a second analog input port AI2 of the sub control circuit portion 120B so that digital converted values of various types of analog input signals are supplied to the sub CPU 20 via the multichannel AD converter 23. In addition, a part of the first analog sensor 104*a* connected to an analog input interface circuit 114*a* is also connected to the second analog input port AI2 of the sub control circuit portion 120B so that digital converted value of various types of analog input signals are supplied to the sub CPU 20 via the multichannel AD converter 23. These analog input signals become effective when the power switch 103 is closed.

An ON/OFF signal generated by the second switch sensor 105*b* is supplied to the sub CPU 20 via a digital input interface circuit 125*b* and a second digital input port DI2 of the sub control circuit portion 120B. In addition, a part of an ON/OFF signal generated by the first switch sensor 105*a* input to a digital input interface circuit 115*a* is also supplied to the sub CPU 20 via the second digital input port DI2 of the sub control circuit portion 120B. These switch signals become effective when the power switch 103 is closed.

An output interface circuit 126*b* is disposed between an output port DO2 of the sub control circuit portion 120B and the second electric load 106*b* and responds to a control output signal from the sub CPU 20 so as to perform the drive control of the second electric load 106*b*. Note that the second electric load 106*b* includes various types of auxiliary equipment such as a solenoid for driving the ventilating valve of the fuel tank, a compression or decompression pump for air in the fuel tank, an electromagnetic clutch for driving an air conditioner. A buffer amplifier 129 responds to an output voltage of the power supply switch element 130 that is described later so as to supply the same voltage as the output voltage to a part of the second analog sensor 104*b* as a drive power. In addition, the buffer amplifier 129 protects a sub power supply circuit 122 from damage even if an abnormal short circuit occurs in external wiring.

The power supply switch element 130 is connected to an output terminal of the sub power supply circuit 122 so as to generate a voltage Vadc2 for a second converter and to supply electric power to the analog input interface circuit 124*b* and the digital input interface circuit 125*b*. A power supply switch element 137 that works together with the power supply switch element 130 makes connection between the on-vehicle battery 101 and the second switch sensor 105*b* or the second electric load 106*b*. However, power supply to the second electric load 106*b* is cut off by a power transistor in the output interface circuit 126*b*, and hence it is possible to supply electric power not via the power supply switch element 137 but directly from the on-vehicle battery 101 by wiring.

(2) Detailed Description of Action and Operation

Figure 7:
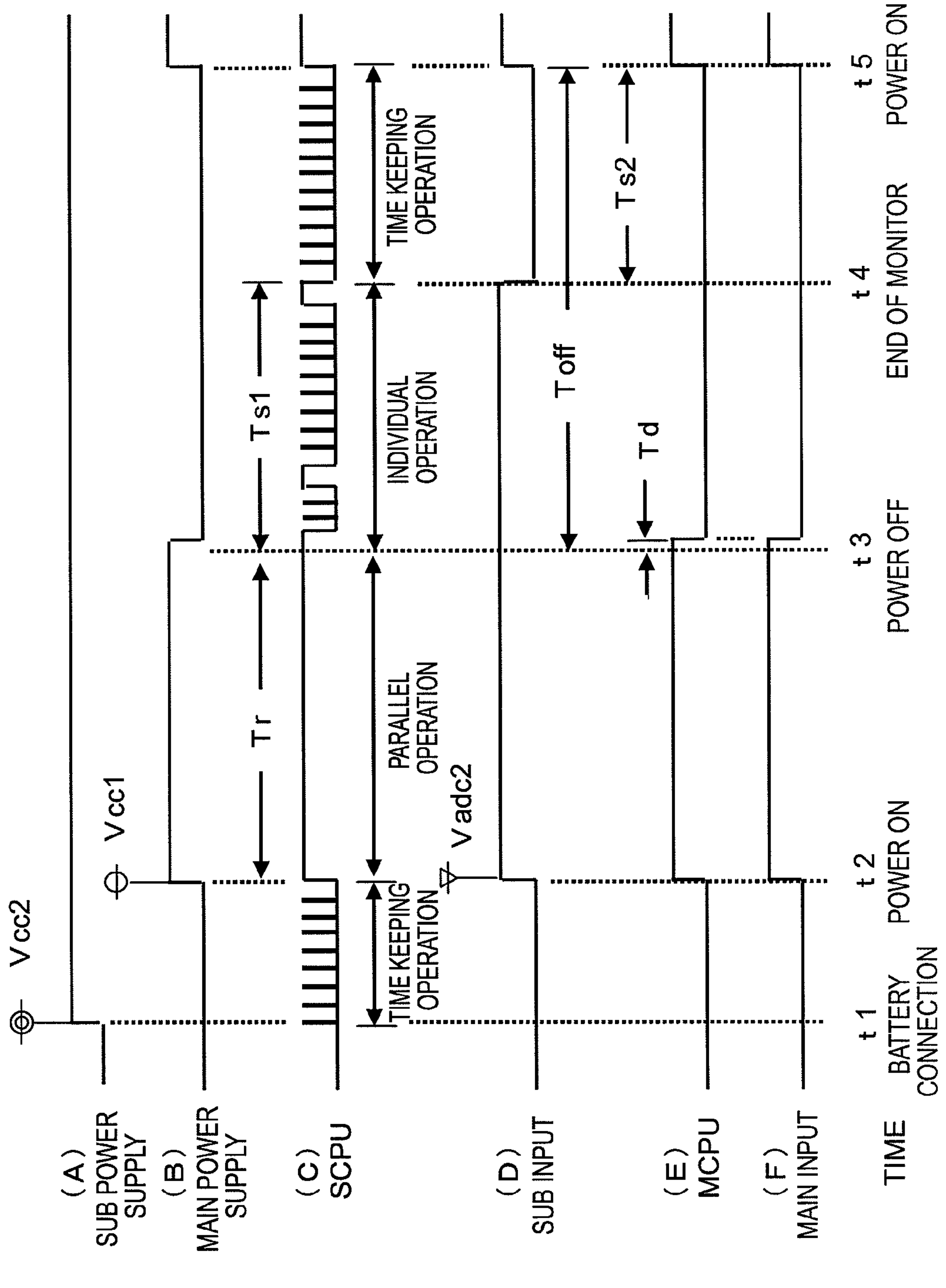
FIG. 7 is a transition timing chart of operating modes of the on-vehicle electronic control device illustrated in FIG. 6.

Next, a general operation of the structure illustrated in FIG. 6 is described with reference to a timing chart illustrated in FIG. 7. In FIG. 7, the timing charts of (A) to (F) except for (C) are the same as the timing charts (A), (B), and (D) to (F) of FIG. 2, respectively. (C) of FIG. 7 illustrates the operating mode of the sub CPU 20. In a period from a time point t1 to a time point t2, a time keeping operation as a third operating mode is performed. In a period from the time point t2 to a time point t3, a parallel operation as a first operating mode is performed, and the sub CPU 20 cooperates with the main CPU 10 so as to bear a part of the general control and monitoring. The sub CPU 20 continues to perform the individual operation as a second operating mode while the main CPU 10 is stopped after the time point t3. When parked state monitoring of the parked vehicle is finished at a time point t4, the process of the sub CPU 20 goes to the time keeping operation as the third operating mode. Note that the period between the time points t2 and t3 is illustrated as parallel operation time Tr, a period between the time points t3 and t4 is illustrated as individual operation time Ts1, a period between the time point t4 and a time point t5 when the power switch 103 is closed again is illustrated as simple parked time Ts2, and a period between the time points t3 to t5 is illustrated as parking time Toff=Ts1+Ts2.

Details of the switch control of the general operating mode are as described above with reference to the flowchart illustrated in FIG. 3. Further in FIG. 3, details of the step block 302 for performing the time keeping operation are as described above with reference to the flowchart illustrated in FIG. 4. Details of the step block 308 for performing the individual operation are described later with reference to a flowchart illustrated in FIG. 8. A middle speed clock signal source 121 of the sub CPU 20 becomes effective intermittently, and the sub CPU 20 works mainly by the low speed clock signal source 25 after the power switch is turned off. In addition, details of the step block 306 for performing the parallel operation are described later with reference to a flowchart illustrated in FIG. 9. The sub CPU 20 cooperates with the main CPU 10 for control concerning a part of the input and output signals.

With reference to FIG. 6 again, when the power switch 103 is closed so that the main CPU 10 and the sub CPU 20 cooperate with each other, the main CPU 10 is supplied with analog input signals from the first and second analog sensors 104*a* and 104*b* and the ON/OFF signals from the first and second switch sensors 105*a* and 105*b*. The main CPU 10 responds to the contents of the input and output control program stored in the first program memory 11B so as to perform the drive control of the first and second electric loads 106*a* and 106*b*. The sub CPU 20 transmits operating states of the second analog sensor 104*b* and the second switch sensor 105*b* to the main CPU 10 via the serial-to-parallel converters 24 and 14, and receives the control signal from the main CPU 10 via the serial-to-parallel converters 14 and 24 so as to drive the second electric load 106*b*.

A part of the analog signal supplied from the first analog sensor 104*a* to the sub CPU 20 is, for example, a signal detected by a pair of gas pedal position sensors and a pair of throttle position sensors that are disposed as a duplexed system. The sub CPU 20 judges presence or absence of an abnormal state like a break or a short circuit of the gas pedal position sensor or the throttle position sensor based on the detection signal. If an abnormal state is detected, a second error signal ER2 is generated so as to cut off a power supply circuit of a motor for controlling a throttle valve opening degree or to drive the warning display unit 107.

Figure 8:
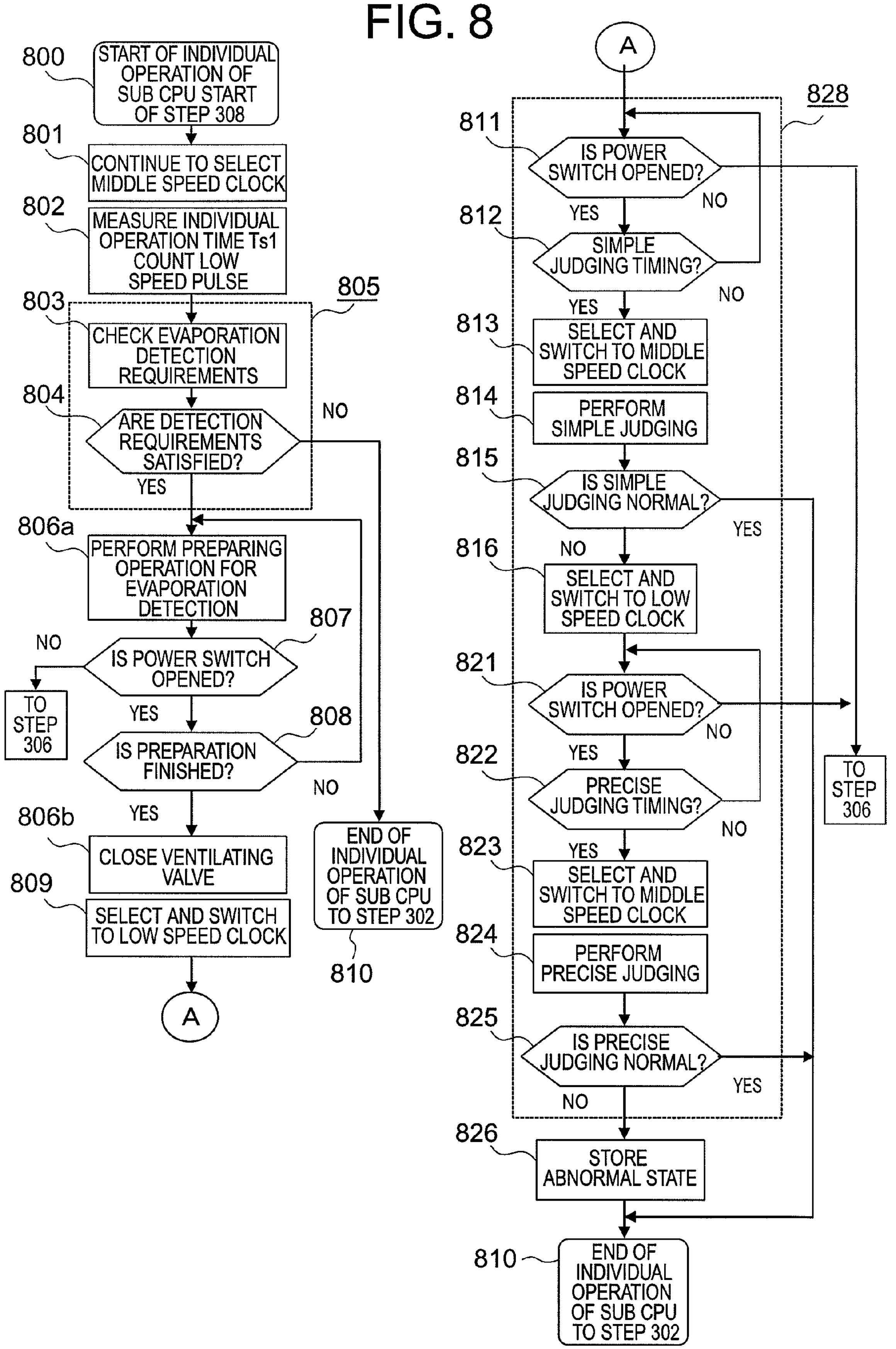
FIG. 8 is a flowchart of individual operation of the on-vehicle electronic control device illustrated in FIG. 6.

Next, FIG. 8 that is a flowchart of the individual operation of the on-vehicle electronic control device illustrated in FIG. 6 is described. In FIG. 8, Step 800 is a step for the sub CPU 20 to start the individual operation. Step 800 corresponds to the initial step of Step 308 illustrated in FIG. 3. The next Step 801 is a step of generating a switch instruction signal for connecting a middle speed clock signal from the middle speed clock signal source 121 to a clock signal input terminal of the sub CPU 20 by the clock signal switch circuit 26. The next Step 802 is a step of measuring lapse time of the individual operation by counting the number of low speed clock signals from the low speed clock signal source 25 connected to the input terminal of the sub CPU 20. When the individual operation time is measured, similarly to the time keeping operation illustrated in FIG. 4, a low speed clock signal period is calibrated with reference to the middle speed clock signal as reference time while the time keeping is performed by counting the number of generations of the low speed clock signals.

In the next Step 803, detection requirements about whether or not fuel evaporation detection should be performed are checked. In the next Step 804, if the detection requirements checked in Step 803 are satisfied, judging of YES is performed and the process goes to Step 806*a*. If the detection requirements are not satisfied, judging of NO is performed and the process goes to Step 810 of finishing the operation. Then, the process goes to Step 302 of FIG. 3. Note that a step block 805 including Step 803 and Step 804 is to be requirement judging means. The requirement judging means omits execution of evaporation detection means this time if at least the lapse time from the last evaporation judging to the present time is a predetermined time or shorter, and the process goes to Step 810 of finishing the operation. The requirement judging means further responds to an abnormal state of a break or a short circuit in the input and output circuit of the sub CPU 20, and an abnormal state of voltage decrease in the on-vehicle battery 101, so as to omit execution of the evaporation detection means this time and to go to Step 810 of finishing the operation. Step 806*a* is a step of performing preparation for the fuel evaporation detection. In Step 806*a*, the solenoid for driving the ventilating valve that is one of the second electric loads 106*b* is driven so that the fuel tank is opened to the air.

In the next Step 807, it is judged whether or not the power switch 103 is opened. If the judging in Step 807 is YES, which means that the power switch 103 is opened, the process goes to Step 808. If the power switch 103 is closed, judging of NO is performed and the process goes to Step 306 of FIG. 3. In Step 808, it is judged whether or not the fuel tank has opened to the air due to passing of a predetermined time. If the fuel tank has not opened, judging of NO is performed and the process goes back to Step 806*a*. If the fuel tank has opened, judging of YES is performed and the process goes to Step 806*b*, in which the ventilating valve is closed and then the process goes to Step 809. Note that it is possible to close the ventilating valve in Step 806*b* and to activate the compression pump or the decompression pump so as to start compression or decompression of air in the fuel tank. Step 809 is a step of switching and connecting the low speed clock signal source 25 to the clock signal terminal of the sub CPU 20.

The next Step 811 is a step of judging whether or not the power switch 103 is opened. If the judging in Step 811 is YES, which means that the power switch 103 is opened, the process goes to Step 812. If the power switch 103 is closed, judging of NO is performed and the process goes to Step 306 of FIG. 3. In Step 812, it is judged whether or not to be simple judging timing. If it is not the simple judging timing, judging of NO is performed and the process goes back to Step 811. If it is the simple judging timing, judging of YES is performed and the process goes to Step 813. Step 813 is a step of switching and connecting the middle speed clock signal source 121 to the clock signal terminal of the sub CPU 20, and the process goes to the next Step 814. In Step 814 to be simple judging means, the simple judging of the fuel evaporation detection is performed, and the process goes to Step 815. If a result of the simple judging in Step 814 is normal, judging of YES is performed in Step 815, and the process goes to Step 810 of finishing the operation. If the normal judging cannot be performed as a result of the simple judging, judging of NO is performed and the process goes to Step 816. Step 816 is a step of switching and connecting the low speed clock signal source 25 to the clock signal terminal of the sub CPU 20, and the process goes to the next Step 821.

Note that the simple judging means (Step 814) performs the normal judging if the pressure of the fuel tank detected by the pressure sensor maintains a first pressure value close to an ideal normal pressure (e.g., 100±5% of ideal pressure) in a first time period (e.g., 10 minutes) after the power switch 103 is opened. It is judged in Step 812 whether or not the first time period has passed, and it is judged in Step 814 whether or not the first pressure value is maintained. In addition, the value of the first time period or the first pressure value is corrected based on the digital converted values of the environment temperature sensor and the fuel remaining quantity sensor supplied to the sub CPU 20. If the fuel remaining quantity is large or the fuel is in a high temperature state, the first time period is shortened or the first pressure value is set to be a high value.

The next Step 821 is a step of judging whether or not the power switch 103 is opened. If the judging in Step 821 is YES, which means that the power switch 103 is opened, the process goes to Step 822. If the power switch 103 is closed, judging of NO is performed and the process goes to Step 306 of FIG. 3. In Step 822, it is judged whether or not to be precise judging timing. If it is not the precise judging timing, judging of NO is performed and the process goes back to Step 821. If it is the precise judging timing, judging of YES is performed and the process goes to Step 823. Step 823 is a step of switching and connecting the middle speed clock signal source 121 to the clock signal terminal of the sub CPU 20, and the process goes to the next Step 824.

In Step 824 to be precise judging means, the precise judging of the fuel evaporation detection is performed and the process goes to Step 825. If a result of the precise judging in Step 824 is normal, judging of YES is performed in Step 825 and the process goes to Step 810 of finishing the operation. If the normal judging cannot be performed as a result of the precise judging, judging of NO is performed and the process goes to Step 826. Note that the precise judging means is performed if the normal judging has not been performed by the simple judging means. The precise judging means performs the normal judging if the pressure detected by the pressure sensor maintains a second pressure value during a second time period (e.g., 50 minutes) that is longer than the first time period. This second pressure value is a pressure that is different from the ideal normal pressure but enables to perform acceptance judging (e.g., 100±10% of ideal pressure). It is judged in Step 822 whether or not the second time period has passed, and it is judged in Step 824 whether or not the second pressure value is maintained.

In addition, the value of the second time period or the second pressure value is corrected based on the digital converted values of the environment temperature sensor and the fuel remaining quantity sensor supplied to the sub CPU 20. If the fuel remaining quantity is large or the fuel is in a high temperature state, the second time period is shortened or the second pressure value is set to be a high value. In Step 826, after the occurrence of the abnormal state is stored, the process goes to Step 810 of finishing the operation. The fuel evaporation abnormal state stored in Step 826 is reported and transmitted to the main CPU 10 when the power switch 103 is closed. A step block 828 including Steps 811 to 825 is to be the evaporation detection means. When the simple judging means 814 performs the normal judging, execution of the precise judging means 824 is omitted. The sub CPU 20 goes out from the individual operating mode in a short time, and the process goes to Step 302 of FIG. 3 via Step 810 of finishing the operation so that the time keeping operation with low power consumption is started.

Figure 9:
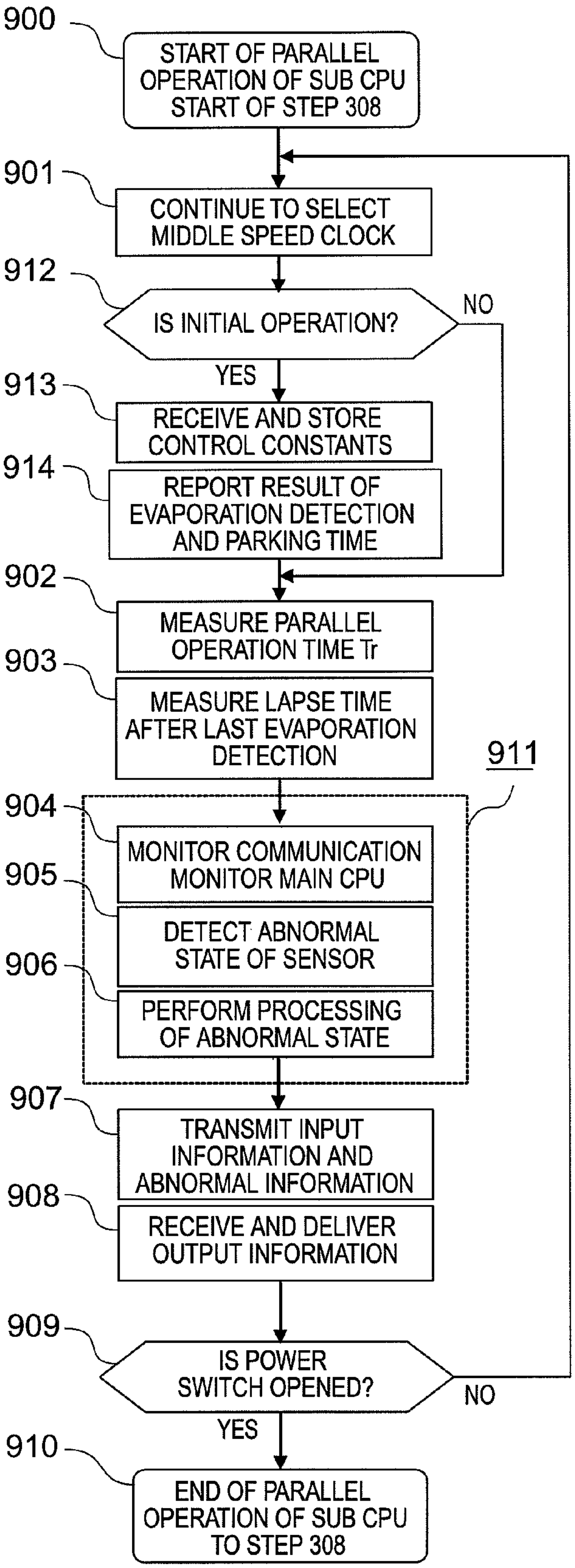
FIG. 9 is a flowchart of a parallel operation of the on-vehicle electronic control device illustrated in FIG. 6.

Next, FIG. 9 that is a flowchart of the parallel operation of the on-vehicle electronic control device illustrated in FIG. 6 is described. In FIG. 9, Step 900 is a step for the sub CPU 20 to start the parallel operation. Step 900 corresponds to the initial step of Step 306 of FIG. 3. The next Step 901 is a step of generating a switch instruction signal for connecting the middle speed clock signal from the middle speed clock signal source 121 to the clock signal input terminal of the sub CPU 20 by the clock signal switch circuit 26.

The next Step 912 is a judging step of judging whether or not to be the first operation after the power switch 103 is closed, based on an operating state of a flag (not shown). If it is the first operation, judging of YES is performed and the process goes to Step 913. If it is not the first operation, judging of NO is performed and the process goes to Step 902. Step 913 is a step of receiving control constants stored in the first program memory 11B and for storing the same in the RAM memory 22. The next Step 914 is a step of transmitting values of the simple parked time Ts2 measured in Step 408 illustrated in FIG. 4 and individual operation time Ts1 measured in Step 802 illustrated in FIG. 8 and a result of the abnormal state judging in Step 826 to the main CPU 10. After Step 914, the process goes to Step 902.

The next Step 902 is a step of measuring lapse time of the parallel operation by a parallel communication operation time keeping counter that counts the number of frequency division pulses of the middle speed clock signal. When this parallel operation time Tr is measured, similarly to the time keeping operation illustrated in FIG. 4, it is possible to calibrate the low speed clock signal period with reference to the middle speed clock signal as the reference time while the time keeping is performed based on the number of generations of the low speed clock signals.

The next Step 903 is a step of calculating lapse time after the last evaporation detection. In Step 903, accumulated values are calculated with respect to the simple parked time Ts2 measured in Step 408 of FIG. 4 (parking time after power switch 103 is opened and sub CPU 20 has finished parked state monitoring by individual operation), the individual operation time Ts1 that is parked state monitoring time measured in Step 802 of FIG. 8 and the parallel operation time Tr measured in Step 902. If the accumulated time in Step 903 exceeds a predetermined value (e.g., 5 hours), the fuel evaporation detection is performed when the power switch 103 is opened next time. The judging of normal or abnormal state is performed so as to reset the accumulated time, the simple parked time, parked state monitoring time, communication operation time and other stored information that are accumulated individually.

The next Step 904 is a step of checking and monitoring whether or not the main CPU 10 is working normally and whether or not the serial communication between the main CPU 10 and the sub CPU 20 is performed normally. In Step 904, for instance, the sub CPU 20 transmits a predetermined constant to the main CPU 10, the main CPU 10 transmits the received constant back to the sub CPU 20, and the sub CPU 20 checks whether or not the received predetermined constant matches the transmitted predetermined constant and whether or not the returning transmission has been performed in a predetermined time.

The next Step 905 is a step to be detection means for an abnormal state of a break or a short circuit in the input sensor circuit. In Step 905, concerning a part or a whole of the first and second analog sensors 104*a* and 104*b* and the first and second switch sensors 105*a* and 105*b* which are connected to the second analog input port AI2 and the second digital input port DI2 of the sub control circuit portion 120B, it is judged whether or not there is an abnormal state of a break in the input signal wiring, an abnormal state of a short circuit to ground due to a contact with a ground line, or an abnormal state of a short circuit to power supply due to a contact with a power supply line.

In the next Step 906, the second error signal ER2 is generated if the abnormal state judging is performed in Steps 904 and 905. The second error signal ER2 acts on an output interface circuit 116*a* so that drive of a part electric load (e.g., power supply relay for supplying electric power to motor for controlling throttle valve opening degree) of the first electric load 106*a* is stopped, a warning display instruction signal is supplied to the warning display unit 107, and abnormal state occurrence information is stored in the RAM memory 22.

The next Step 907 is a step of transmitting the input information or the abnormal state information to the main CPU 10. In Step 907, the digital converted value of the analog signal and the ON/OFF information supplied from the second analog sensor 104*b* and the second switch sensor 105*b* are transmitted, and the abnormal state information judged to be an abnormal state in Steps 904 and 905 and stored in the RAM memory 22 in Step 906, and the fuel evaporation abnormal state information stored in Step 826 illustrated in FIG. 8 are transmitted. Note that the abnormal state information transmitted here is temporarily stored in the RAM memory 12 of the main control circuit portion 110B and is transmitted to and stored in the nonvolatile data memory in Step 317 illustrated in FIG. 3 immediately after the power switch 103 is opened.

The next Step 908 is a step of receiving the output control signal information transmitted from the main CPU 10 so as to generate a drive output for the second electric load 106*b*. The next Step 909 is configured so that it is judged whether or not the power switch 103 is opened. If the power switch 103 is closed, judging of NO is performed and the process goes back to Step 901. If the power switch 103 is opened, judging of YES is performed and the process goes to Step 910 of finishing the operation. After Step 910 of finishing the operation, the process goes to Step 308 illustrated in FIG. 3.

(3) Other Embodiments

In First Embodiment illustrated in FIG. 1, the power supply switch elements 130 and 137 are closed in the parallel operating state and the individual operating state of the sub CPU 20. However, in the application that the sub CPU 20 does not need the detection signal from the second analog sensor 104*b* in the parallel operating state, the power supply switch element 130 may be configured to be closed only in the individual operating mode of the sub CPU 20. In addition, if the sub CPU 20 has an input and output sharing port that can be selected and switched, and if selection of the output port realizes lower power consumption, for instance, the sub CPU 20 may switch the output only port to stop output generation of the output port so that useless power consumption can be prevented in the time keeping only mode in which input and output information is not handled.

Further, the control for the purpose of fuel evaporation detection of the fuel tank is described in the Embodiments 1 and 2 illustrated in FIGS. 1 and 6, but the on-vehicle electronic control device of the present invention can also be applied to abnormal state judging of a water temperature sensor for cooling water of an engine, for instance. In this case, in the individual operating mode of the sub CPU 20, for instance, temperature information from the water temperature sensor and the outside air temperature sensor may be monitored at intervals of several minutes after the power switch 103 is opened so that it is judged whether or not the detected water temperature is becoming close to the outside air temperature gradually. After the normal or abnormal state judging, the process may go to a mode for measuring the simple parked time Ts2. In this case, it is possible to switch to the middle speed clock signal source 121 for operation for several tens of milliseconds as a time period for the temperature information monitoring and the abnormal state judging, for instance, and to operate in the low power consumption mode with the low speed clock signal source 25 for major period of time in the period of several minutes.

In addition, if the operation time of the engine is a predetermined time or shorter, it is possible to avoid execution of the above-mentioned water temperature monitoring control so that useless generation of power consumption can be suppressed. In addition, if a temperature difference between the initial water temperature and the outside air temperature is so large that the water temperature has decreased rapidly after the engine has stopped, the normal judging of the water temperature sensor can be performed in a short time. Therefore, this is regarded as the simple judging means. In contrast, if the temperature difference between the initial water temperature and the outside air temperature is so small that the water temperature has not decreased rapidly after the engine has stopped, the normal judging of the water temperature sensor is performed in a relatively long time, which is regarded as the precise judging means. Thus, the simple judging means and the precise judging means are used in a distinguished manner so that power consumption can be reduced.

The above description does not refer to the fuel evaporation detection while the vehicle is operated in which the power switch 103 is closed, but it is desirable actually to perform the control of detecting pressure in the fuel tank for detecting an uncapped state of the fuel tank. In this case, the ventilating valve of the fuel tank is closed, and the compression or decompression pump is driven so as to compress or decompress air in the fuel tank for monitoring characteristics of change of pressure detected by the pressure sensor. Thus, the uncapped state of the fuel tank can be detected.

On the other hand, in the operating flowchart of the sub CPU 20 illustrated in FIGS. 3, 4, 5, 8 and 9, many steps of judging the opened or closed state of the power switch 103 are disposed, and the operation signal of the power switch 103 is supplied also to the sub CPU 20, as a precondition of the flowchart. However, as a real device, the sub CPU 20 has a power flag memory (not shown), and the main CPU 10 issues an instruction to set the power flag memory in Step 313 of FIG. 3 and issues an instruction to reset the power flag memory in the step block 317 of FIG. 3. The sub CPU 20 activates and stops the power flag memory based on the set and reset instructions issued by the main CPU 10, and judges whether or not the main CPU 10 is working in accordance with whether or not the power flag memory is working. This judging is replaced with the judging whether the power switch 103 is opened or closed.

(4) Main Points and Features of Second Embodiment

As understood from the above description, the on-vehicle electronic control device 100B of Second Embodiment of the present invention includes the main control circuit portion 110B and the sub control circuit portion 120B. The main control circuit portion 110B is supplied with electric power from the on-vehicle battery 101 via the power switching element 102*a* and the main power supply circuit 112 responding to the operation of the power switch 103, and includes the microprocessor as the main CPU 10 with the high speed and large-capacity memory area that responds to operating states of the plurality of input sensors 104*a*, 104*b*, 105*a* and 105*b*, and the contents of the first program memory 11B for driving a plurality of electric loads 106*a* and 106*b*. The sub control circuit portion 120B is supplied with electric power continuously from the on-vehicle battery 101 via the sub power supply circuit 122, and includes the microprocessor as the sub CPU 20 that is connected to the main CPU 10 via the serial interface and has the middle speed and the small-capacity memory area compared with the main CPU 10. The sub CPU 20 has the first, second and third operating modes 306, 308 and 302 for responding to the control program stored in the second program memory 21B, the middle speed clock signal source 121 that is used in a selective and switched manner, the low speed clock signal source 25, and the power supply switch elements 130 and 137 for supplying electric power to the input interface circuits 124*b* and 125*b*. The first operating mode 306 is operated in parallel with the main CPU 10 in the state where the power switch 103 is closed so as to communicate information with the main CPU 10 as the parallel operating mode. The sub CPU 20 detects at least presence or absence of an abnormal state of a communication response in the main CPU 10 for monitoring the operating state of the main CPU. The sub CPU 20 operates based on the middle speed clock signal generated by the middle speed clock signal source 121.

The second operating mode 308 is the individual operating mode that operates during a predetermined period of time after the main CPU 10 has stopped its operation while the power switch 103 is opened. In this period, the power supply switch element 130 that makes a part of the input and output signals of the sub CPU 20 effective is closed. The sub CPU 20 performs the parked state monitoring of the parked vehicle based on the part of the input and output signals that is made to be effective so as to measure the lapse time after the power switch 103 has been opened. The sub CPU 20 works based on the middle speed clock signal generated by the middle speed clock signal source 121. The third operating mode 302 is the time keeping only mode that operates during the period of time after the individual operation is finished until the power switch 103 is closed again while the power supply switch element 130 is opened, so as to measure the lapse time after the second operating mode 308 has been finished. The sub CPU 20 works based on the low speed clock signal generated by the low speed clock signal source 25. In the second and third operating modes 308 and 302, the monitoring function in the operating state of the main CPU 10 is stopped, and the operation results of the sub CPU 20 in the second and third operating modes 308 and 302 are transmitted to the main CPU 10 in the first operating mode 306.

In addition, the first operating mode 306 further includes the input and output communication means 907 and 908 that transmit the input signal from the second analog sensor 104*b* or second switch sensor 105*b* connected to the sub CPU 20 to the main CPU 10 and drive the second electric load 106*b* connected to the sub CPU 20 based on the output signal generated by the main CPU 10, so as to bear a part of the input and output control.

Thus, the sub CPU shares and bears the load of the input and output control. Therefore, even if the number of inputs and outputs increases for supporting various types of the vehicle, it is possible to support standard adoption of a high function main CPU on software. It is possible to reduce a control load of the main CPU by the sub CPU judging an abnormal state of a part of inputs and outputs, or an abnormal state of the main CPU itself is monitored so that safety in controlling the vehicle can be improved.

In addition, the first operating mode 306 further includes the abnormal state monitor processing means 911 that performs diagnostics of presence or absence of an abnormal state of the wiring in a part of the input and output signals connected to the main CPU 10 or the sub CPU 20, and monitors the communication response operating state of the main CPU 10 so as to issue the warning of the abnormal state or to stop driving of the part of the electric load if an abnormal state is detected.

Thus, the sub CPU monitors the main CPU and an abnormal state of the input and output wiring so as to perform the abnormal state process. Therefore, the sub CPU not only performs the parking monitor but also shares a part of the monitoring function when the vehicle is operated so that safety of the general control can be improved and that a load on the main CPU can be reduced.

In addition, the parked state monitoring control of the part of the inputs and outputs in the second operating mode 308 is performed intermittently, and the second program memory 21B includes the control program to be the clock switching means 801, 809, 813, 816 and 823. The clock switching means are the switch instruction generating means for selecting and using the middle speed clock signal source 121 in the time zone in which the sub CPU 20 performs the input and output control and for selecting and using the low speed clock signal source 25 in the time zone in which the sub CPU 20 does not perform the input and output control. Thus, the individual operation after the main power is opened is performed intermittently. Therefore, power consumption of the sub CPU can be reduced more in the idle period of the input and output control.

In addition, the middle speed clock signal source 121 is a clock signal source having relatively high accuracy using a ceramic resonator or a crystal resonator while the low speed clock signal source 25 is a semiconductor ring oscillator having low power consumption and low accuracy. The second program memory 21B further includes a control program to be the time keeping calibration means 411. The time keeping calibration means 411 regularly enables the middle speed clock signal source 121 in the third operating mode 302 so as to measure the clock signal period τ1 of the low speed clock signal source 25 with reference to the clock signal period τ2 of the middle speed clock signal source 121. The sub CPU 20 performs the time keeping operation based on the measured low speed clock signal period τ1.

In addition, the sub CPU 20 is supplied with at least a digital converted value of the pressure sensor 104*b* for the fuel tank as the parked state monitoring of a vehicle in the second operating mode 308, and the second program memory 21B further includes a control program to be the evaporation detection means 828. The evaporation detection means 828 monitors a variation of pressure in the fuel tank in the second operating mode 308 so as to judge presence or absence of fuel evaporation. In the first operating mode 306, the sub CPU 20 transmits the presence or absence of an abnormal state of the fuel evaporation detected by the evaporation detection means 828 to the main CPU 10.

In addition, the control output terminal of the sub CPU 20 is connected to the solenoid 106*b* for driving the ventilating valve. In the second operating mode 308, the evaporation detection means 828 further monitors change of pressure in the fuel tank that has been sealed after temporarily opened to the air by the solenoid 106*b* for driving the ventilating valve so as to judge presence or absence of the fuel evaporation.

In addition, a part of the control constants, which is used in the evaporation detection means 828 stored in the second program memory 21B, is stored in the first program memory 11B. The first program memory 11B stores a control program to be the control constant transmission means 313 working together with the sub CPU 20 in the first operating mode 306 and a program to be parking monitor information transmission means 314. The control constant transmission means 313 is means for transmitting the control constants for the evaporation detection written and stored in advance in the first program memory 11B to the RAM memory 22 that works together with the sub CPU 20. The parking monitor information transmission means 314 is means for the main CPU 10 to receive the fuel evaporation detection result detected by the sub CPU 20 and the measurement result of the parking time. The sub CPU 20 performs the fuel evaporation detection based on the control constants transmitted to the RAM memory 22 and the control program to be the evaporation detection means 828 stored in the second program memory 21B.

In addition, the control of the input and output in the second operating mode 308 includes the sensor abnormal state judging function that is performed regularly and intermittently. In the function, the change of pressure in the fuel tank is monitored so that the fuel evaporation detection can be performed, and change of temperature is monitored in parallel by the water temperature sensor for sensing the change of temperature of the cooling water for the engine so that an abnormal state of the water temperature sensor is judged. Thus, in the second operating mode, the water temperature sensor abnormal state judging is performed. Therefore, it is possible to add a role of the sub CPU while the power switch is opened so that an abnormal state of the water temperature sensor can be detected easily.

In addition, the second program memory 21B further stores a control program to be requirement judging means 805 for judging whether or not the evaporation detection means 828 should be performed. The requirement judging means 805 omits execution of the evaporation detection means 828 this time if at least the lapse time from the last evaporation judging to the present time is a predetermined time or shorter, and the process goes to the third operating mode 302.

In addition, the requirement judging means 805 further includes means for omitting execution of the evaporation detection means 828 this time responding to an abnormal state of a break or a short circuit concerning the input and output circuit of the sub CPU 20 and an abnormal state of a voltage decrease in the on-vehicle battery 101 and for going to the third operating mode 302.

In addition, the second program memory 21B further stores a control program to be the simple judging means 814 and a control program to be the precise judging means 824 which concern the evaporation detection means 828. The simple judging means 814 is means for performing the normal judging if the pressure detected by the pressure sensor 104*b* maintains the first pressure value close to the ideal normal pressure in the first time period after the power switch 103 is opened and for omitting the precise judging so as to go to the third operating mode 302. The precise judging means 824 is performed when the simple judging means 814 has not performed the normal judging. The precise judging means 824 performs the normal judging if the pressure detected by the pressure sensor 104*b* maintains the second pressure value that is different from the ideal normal pressure but enables to perform the acceptance judging in the second time period that is longer than the first time period. If the detected pressure does not maintain the second pressure value, the abnormal state judging is performed and the process goes to the third operating mode 302.

In addition, the sub CPU 20 generates the pump drive output for decreasing or increasing inner pressure of the sealed fuel tank. Thus, the compression or decompression pump is added for the evaporation detection. Therefore, the evaporation detection can be performed accurately in a short time.

In addition, the first operating mode 306 further includes the cap abnormal state judging function that generates the pump drive output in the state where the solenoid for driving the ventilating valve of the fuel tank is closed while the detection signal of the pressure sensor is monitored, whereby presence or absence of an uncapped state of the fuel tank can be judged. Thus, the cap abnormal state judging is performed in the first operating mode. Therefore, a role of the sub CPU while the power switch is closed is added, and hence the abnormal state of the fuel tank can be detected easily.

Further, the sub CPU 20 is supplied with the digital converted values from the environment temperature sensor and the fuel remaining quantity sensor, and hence the judged pressure or the judged lapse time in the evaporation detection can be adjusted. Thus, the environment temperature and the fuel remaining quantity information are added for the evaporation detection. Therefore, the evaporation detection can be performed accurately in a short time.

What is claimed is:

1. An on-vehicle electronic control device, comprising:

a main control circuit portion supplied with electric power from an on-vehicle battery via a power switching element responding to an operation of a power switch and a main power supply circuit, including a microprocessor as a main CPU of high speed and large-capacity memory area for driving a plurality of electric loads responding to operating states of a plurality of input sensors and contents of a first program memory; and a sub control circuit portion including a middle speed clock signal source and a low speed clock signal source that are used selectively, supplied with electric power continuously from the on-vehicle battery via a sub power supply circuit, connected to the main CPU via a serial interface, and including a microprocessor as a sub CPU of middle speed and small-capacity memory area compared with the main CPU, wherein:

the sub CPU has a first operating mode, a second operating mode, and a third operating mode responding to a control program stored in a second program memory, and includes a power supply switch element for supplying with electric power to an input interface circuit;

the first operating mode is a parallel operating mode for operating based on a middle speed clock signal generated by the middle speed clock signal source in a closed state of the power switch, so as to operate in parallel with the main CPU and to communicate information with the main CPU, for detecting at least presence or absence of an abnormal state of a communication response in the main CPU and for monitoring an operating state of the main CPU;

the second operating mode is an individual operating mode for operating in a predetermined period of time after the power switch is opened and the main CPU stops its operation, while a power supply switch element for enabling a part of input signals of the sub CPU is closed, so as to monitor a parked state of a parked vehicle based on the enabled part of the input signals and to measure a lapse time after the power switch is opened, and the sub CPU operates based on the middle speed clock signal generated by the middle speed clock signal source;

the third operating mode is a time keeping only mode for operating based on a low speed clock signal generated by the low speed clock signal source, so as to measure a lapse time after the second operating mode is finished while the power supply switch element is opened in a period of time after the individual operation is finished until the power switch is closed again; and a monitoring function of the operating state of the main CPU is stopped in the second operating mode and the third operating mode, and an operation result of the sub CPU in the second operating mode and the third operating mode is transmitted to the main CPU in the first operating mode.

2. An on-vehicle electronic control device according to claim 1, wherein the first operating mode further includes input and output communication means for transmitting an input signal from one of a second analog sensor and a second switch sensor connected to the sub CPU to the main CPU and for driving a second electric load connected to the sub CPU based on an output signal generated by the main CPU so as to bear a part of input and output control.

3. An on-vehicle electronic control device according to claim 2, wherein the first operating mode further includes abnormal state monitor processing means for performing diagnosis of presence or absence of an abnormal state in wiring on a part of input and output signals connected to one of the main CPU and the sub CPU and for monitoring a communication response operating state of the main CPU so as to perform one of warning of the abnormal state and stopping to drive a part of the plurality of electric loads if an abnormal state is detected in the communication response operating state.

4. An on-vehicle electronic control device according to claim 1, wherein:

the second operating mode performs parked state monitoring control of a part of inputs and outputs intermittently;

the second program memory includes a control program serving as clock switching means; and the clock switching means is switch instruction generating means for selecting and using the middle speed clock signal source in a time zone while the sub CPU performs input and output control and for selecting and using the low speed clock signal source in a time zone while the sub CPU does not perform the input and output control.

5. An on-vehicle electronic control device according to claim 1, wherein:

the middle speed clock signal source is a clock signal source with relatively high accuracy using one of a ceramic resonator and a crystal resonator;

the low speed clock signal source is a semiconductor ring oscillator with low power consumption and low accuracy;

the second program memory further includes a control program serving as time keeping calibration means for enabling the middle speed clock signal source regularly in the third operating mode so as to measure a clock signal period of the low speed clock signal source with reference to a clock signal period of the middle speed clock signal source; and the sub CPU performs a time keeping operation based on the measured clock signal period of the low speed clock signal source.

6. An on-vehicle electronic control device according to claim 1, wherein:

the sub CPU is supplied with at least a digital converted value of a pressure sensor for a fuel tank as parked state monitoring of the vehicle in the second operating mode;

the second program memory further includes a control program serving as evaporation detection means; and the evaporation detection means monitors a change of pressure in the fuel tank in the second operating mode so as to judge presence or absence of fuel evaporation, and transmits, in the first operating mode, the presence or absence of an abnormal state of the fuel evaporation judged by the evaporation detection means to the main CPU.

7. An on-vehicle electronic control device according to claim 6, further comprising a solenoid for driving a ventilating valve, which is connected to a control output terminal of the sub CPU, wherein the evaporation detection means judges the presence or absence of the fuel evaporation in the second operating mode by monitoring a change of pressure in the fuel tank that has been sealed after being opened to air by the solenoid for driving the ventilating valve.

8. An on-vehicle electronic control device according to claim 6, wherein:

a part of control constants used by the evaporation detection means stored in the second program memory is stored in the first program memory;

the first program memory includes a control program serving as control constant transmission means working together with the sub CPU in the first operating mode and a program serving as parking monitor information transmission means;

the control constant transmission means is means for transmitting control constants for evaporation detection written and stored in the first program memory in advance to a RAM memory cooperating with the sub CPU;

the parking monitor information transmission means is means for transmitting a fuel evaporation detection result detected by the sub CPU and a measurement result of parking time to the main CPU; and the sub CPU performs fuel evaporation detection based on the control constants transmitted to the RAM memory and the control program serving as the evaporation detection means stored in the second program memory.

9. An on-vehicle electronic control device according to claim 8, wherein control of inputs and outputs in the second operating mode is performed regularly and intermittently so that the change of pressure in the fuel tank is monitored for performing the fuel evaporation detection, and includes a sensor abnormal state judging function, in which a change of temperature is monitored in parallel by a water temperature sensor for sensing temperature of cooling water for an engine so that an abnormal state of the water temperature sensor is judged.

10. An on-vehicle electronic control device according to claim 6, wherein:

the second program memory further includes a control program serving as requirement judging means for judging whether or not the evaporation detection means should be executed; and the requirement judging means omits execution of the evaporation detection means this time and goes to the third operating mode if at least lapse time after the last evaporation judging until the present time is predetermined time or shorter.

11. An on-vehicle electronic control device according to claim 10, wherein the requirement judging means further includes means for responding to an abnormal state of a break or a short circuit about input and output circuit of the sub CPU and an abnormal state of decreasing voltage of the on-vehicle battery so as to omit execution of the evaporation detection means this time and to go to the third operating mode.

12. An on-vehicle electronic control device according to claim 6, wherein:

the second program memory further includes a control program serving as simple judging means concerning the evaporation detection means and a control program serving as precise judging means;

the simple judging means is means for performing a normal judging and for omitting a precise judging so as to go to the third operating mode if a pressure detected by the pressure sensor maintains a first pressure value close to ideal normal pressure in a first time period after the power switch is opened; and the precise judging means is executed when the normal judging has not been performed by the simple judging means, performs the normal judging when the pressure detected by the pressure sensor maintains a second pressure value that deviates from the ideal normal pressure but enables an acceptance judging in a second time period that is longer than the first time period, and performs an abnormal judging so as to go to the third operating mode when the pressure detected by the pressure sensor does not maintain the second pressure value.

13. An on-vehicle electronic control device according to claim 12, wherein the sub CPU generates a pump drive output for decreasing or increasing inner pressure of a sealed fuel tank.

14. An on-vehicle electronic control device according to claim 13, wherein the first operating mode further includes a cap abnormal state judging function for judging presence or absence of an uncapped state of the fuel tank by generating the pump drive output in a closed state of the solenoid for driving the ventilating valve of the fuel tank and monitoring a detection signal of the pressure sensor.

15. An on-vehicle electronic control device according to claim 6, wherein the sub CPU is supplied with digital converted values from an environment temperature sensor and a fuel remaining quantity sensor so as to adjust one of a judged pressure and a judged lapse time in an evaporation detection.

* * * * *